(12) United States Patent
Choi et al.

(10) Patent No.: US 10,958,094 B2
(45) Date of Patent: Mar. 23, 2021

(54) ELECTRONIC DEVICE FOR CONTROLLING A COMMUNICATION CHANNEL BY USING WIRELESS CHARGING AND OPERATION METHOD OF THE SAME

(71) Applicant: Samsung Electronics Co., Ltd., Suwon-si (KR)

(72) Inventors: Byungyeol Choi, Suwon-si (KR); Seho Park, Suwon-si (KR); Yusu Kim, Suwon-si (KR); Kyungmin Park, Suwon-si (KR); Wooram Lee, Suwon-si (KR); Juhyang Lee, Suwon-si (KR); Yongsang Yun, Suwon-si (KR); Chihyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 16/263,397

(22) Filed: Jan. 31, 2019

(65) Prior Publication Data

US 2020/0036212 A1    Jan. 30, 2020

(30) Foreign Application Priority Data

Jul. 27, 2018  (KR) .......................... 10-2018-0087945

(51) Int. Cl.
*H02J 7/02*  (2016.01)
*H02J 50/12*  (2016.01)
(Continued)

(52) U.S. Cl.
CPC ............. *H02J 7/025* (2013.01); *H02J 50/12* (2016.02); *H02J 50/80* (2016.02); *H04B 5/0037* (2013.01); *H04W 12/06* (2013.01); *H02J 7/00045* (2020.01)

(58) Field of Classification Search
CPC ...................................................... H02J 7/025
(Continued)

(56) References Cited

U.S. PATENT DOCUMENTS 9,642,006 B2    5/2017  Bronk
2012/0299389 A1  11/2012  Lee et al.
(Continued)

FOREIGN PATENT DOCUMENTS

KR   10-2012-0132225 A   12/2012
KR      10-1367342 B1    2/2014
KR   10-2017-0053237 A    5/2017

OTHER PUBLICATIONS

International Search Report with English translation dated Apr. 26, 2019; International Appln. No. PCT/KR2018/014959.

*Primary Examiner* — Edward Tso
*Assistant Examiner* — Ahmed H Omar
(74) *Attorney, Agent, or Firm* — Jefferson IP Law, LLP

(57) ABSTRACT

An electronic device and a method for controlling the operation of the electronic device are provided. The electronic device includes a wireless power reception circuit, a wireless communication circuit, and a processor configured to control to receive first identity information through a first in-band communication channel using the wireless power reception circuit, establish a first out-of-band communication channel based on the first identity information while the first in-band communication channel is established, receive second identity information through a second in-band communication channel while the first out-of-band communication channel is established, disconnect, when the first out-of-band communication channel is established while the second in-band communication channel is established, the first out-of-band communication channel, and establish a (Continued)

second out-of-band communication channel automatically based on the second identity information.

38 Claims, 19 Drawing Sheets

(51) Int. Cl.
*H04W 12/06* (2021.01)
*H04B 5/00* (2006.01)
*H02J 50/80* (2016.01)
*H02J 7/00* (2006.01)

(58) Field of Classification Search
USPC .......................................................... 320/108
See application file for complete search history.

(56) References Cited

U.S. PATENT DOCUMENTS

| | | |
|---|---|---|
| 2015/0118962 A1* | 4/2015 | Chu ..................... H04B 5/0037 455/41.1 |
| 2015/0270740 A1 | 9/2015 | Lee et al. |
| 2016/0372977 A1 | 12/2016 | Nago |
| 2017/0063170 A1 | 3/2017 | Harper et al. |
| 2017/0085129 A1 | 3/2017 | Zeine et al. |
| 2017/0133889 A1* | 5/2017 | Yeo ..................... H02J 7/00712 |
| 2018/0069419 A1 | 3/2018 | Von Novak, III et al. |
| 2018/0323634 A1 | 11/2018 | Lee |

* cited by examiner

ELECTRONIC DEVICE FOR CONTROLLING A COMMUNICATION CHANNEL BY USING WIRELESS CHARGING AND OPERATION METHOD OF THE SAME

CROSS-REFERENCE TO RELATED APPLICATION(S)

This application is based on and claims priority under 35 U.S.C. § 119(a) of a Korean patent application number 10-2018-0087945, filed on Jul. 27, 2018, in the Korean Intellectual Property Office, the disclosure of which is incorporated by reference herein in its entirety.

BACKGROUND

1. Field

The disclosure relates to an electronic device capable of controlling a wireless charging-related communication channel.

2. Description of Related Art

There are many types of popularized electronic devices such as a smartphone, tablet personal computer (PC), personal digital assistant (PDA), laptop PC, and wearable device.

Recently, such electronic devices are being equipped with a separate battery for supplying power necessary to perform various functions. A certain electronic device may be provided with a separate terminal to establish a wire connection with a power supply for charging its own battery.

Recent electronic devices may be designed to support wireless charging. This means that a battery of a recent electronic device can be charged using a wireless charging function. Typically, wireless charging is carried out in close proximity to a power source, for example by placing a wireless charging-enabled electronic device on a charging pad to charge the battery of the device with no wire connection to a separate charging connector.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device as a wireless power transmission device and an electronic device as a wireless power reception device may exchange charging-related data required for use in controlling power transmission or reception and data including information on the power transmission device.

Additional aspects will be set forth in part in the description which follows and, in part, will be apparent from the description, or may be learned by practice of the presented embodiments.

According to the wireless power consortium (WPC) standard for wireless power charging, part of the frequency band in use for wireless power transmission or reception is exploited for data transmission or reception, which is referred to as in-band communication scheme. In the in-band communication scheme, data can be transmitted or received via coils configured for wireless power transmission or reception.

However, the in-band communication scheme has a drawback in that the communication frequency bandwidth is narrow in comparison with the bandwidths of other communication schemes and thus resulting a low data rate that can create a disruption and prevent smooth data transmission or reception.

It may also be possible to implement data communication between the wireless power transmission device and a power reception device in an out-of-band (OOB) communication scheme. In the case where there are electronic devices communicating in the in-band communication scheme and electronic devices communicating in the OBB communication scheme, a cross-connection error may occur such that power control may be disrupted.

In accordance with an aspect of the disclosure, an electronic device is provided. The electronic device includes a wireless power reception circuit, a wireless communication circuit, and a processor configured to control to receive first identity information through a first in-band communication channel connected to a first external wireless power transmission circuit outside the electronic device using the wireless power reception circuit, establish a first out-of-band communication channel with a first external wireless communication circuit corresponding to the first wireless power transmission circuit outside the electronic device based on the first identity information using the wireless communication circuit while the first in-band communication channel is established between the wireless power reception circuit and the first external wireless power transmission circuit, receive second identity information through a second in-band communication channel connected to a second external wireless power transmission circuit outside the electronic device using the wireless power reception circuit while the first out-of-band communication channel is established between the wireless communication circuit and the first external wireless communication circuit, disconnect, when the first out-of-band communication channel is established while the second in-band communication channel is established between the wireless power reception circuit and the second external power transmission circuit, the first out-of-band communication channel, and establish a second out-of-band communication channel with a second external wireless communication circuit corresponding to the second external wireless power transmission circuit outside the electronic device automatically based on the second identity information using the wireless communication circuit.

In accordance with another aspect of the disclosure, an operation method of an electronic device is provided. The operation method includes receiving first identity information through a first in-band communication channel connected to a first external wireless power transmission circuit outside the electronic device using the wireless power reception circuit, establishing a first out-of-band communication channel with a first external wireless communication circuit corresponding to the first wireless power transmission circuit outside the electronic device based on the first identity information using a wireless communication circuit while the first in-band communication channel is established between the wireless power reception circuit and the first external wireless power transmission circuit, receiving second identity information through a second in-band communication channel connected to a second external wireless power transmission circuit outside the electronic device using the wireless power reception circuit while the first out-of-band communication channel is established between the wireless communication circuit and the first external wireless communication circuit, disconnecting, when the first out-of-band communication channel is established while the second in-band communication channel is established between the wireless power reception circuit and the second external power transmission circuit, the first out-of-band communication channel, and establishing a second out-of-band communication channel with a second external wireless communication circuit corresponding to the second external wireless power transmission circuit outside the electronic device automatically based on the second identity information using the wireless communication circuit.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
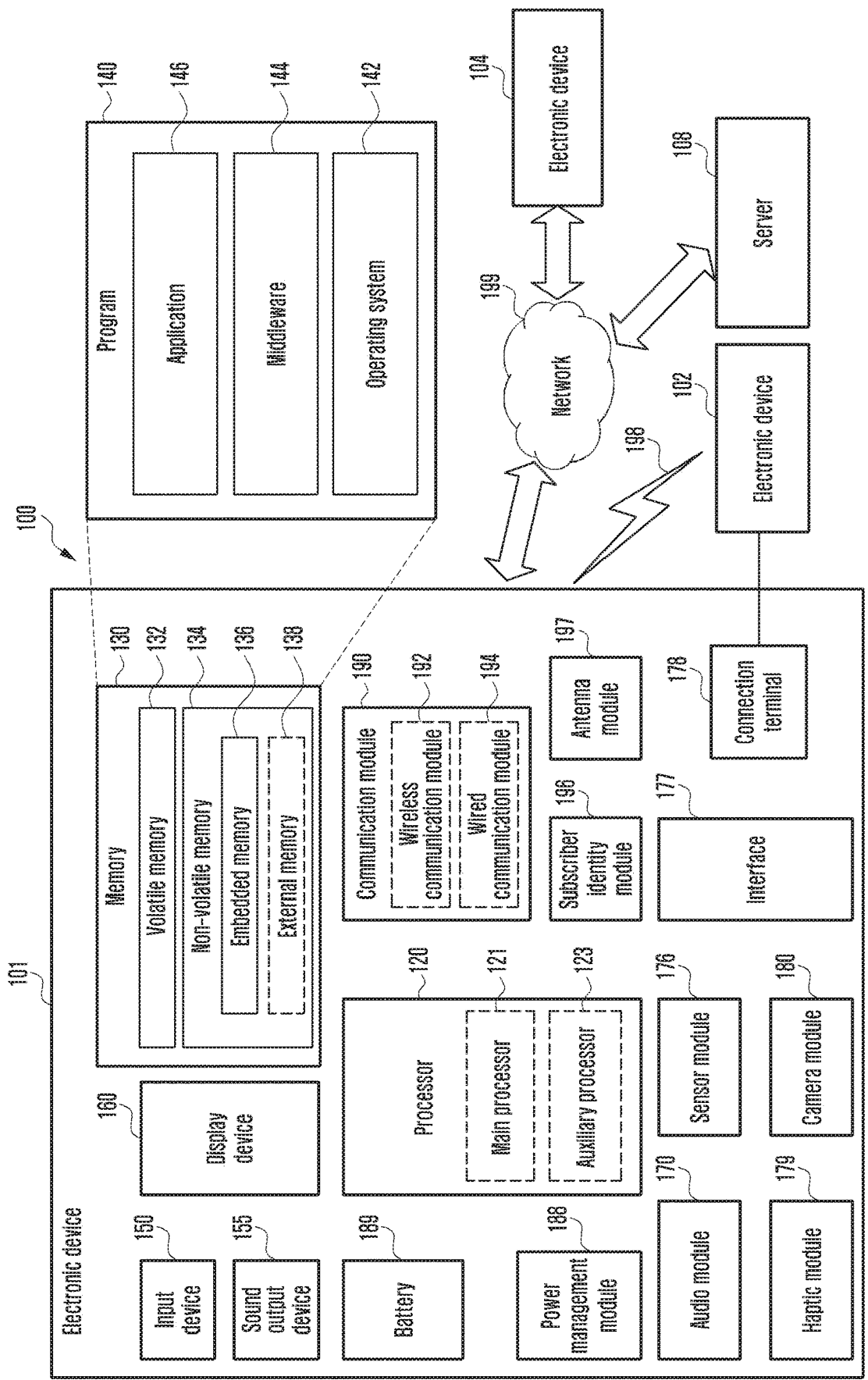
FIG. 1 is a block diagram illustrating a configuration of an electronic device according to various embodiments of the disclosure.

FIG. 1 is a block diagram illustrating an electronic device 101 in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one of the components (e.g., display device 160, camera module 180, etc.) may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be embedded in the display device 160 (e.g., a display) such that the sensor module 176 and the display device 160 are implemented in a single integrated circuit.

The processor 120 may execute, for example, software (e.g., program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., sensor module 176, communication module 190, etc.) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to perform a specific function. The auxiliary processor 123 may be implemented as separate from, or as part of, the main processor 121.

The auxiliary processor 123 may control at least some functions or states related to at least one component (e.g., display device 160, sensor module 176, communication module 190, etc.) among the components of the electronic device 101 while the main processor 121 is in an inactive (e.g., sleep) state, or collaboratively control with the main processor 121 at least some functions or states related to at least one component while the main processor 121 is in an active state (e.g., executing an application). According to an embodiment, the auxiliary processor 123 (e.g., an ISP or a CP) may be implemented as part of another component (e.g., camera module 180, communication module 190, etc.) functionally related to the auxiliary processor 123.

The memory 130 may store various data used by at least one component (e.g., processor 120, sensor module 176) of the electronic device 101. The various data may include, for example, software (e.g., program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., processor 120) of the electronic device 101. The command or data may be generated external to the electronic device 101 (e.g., by a user). The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing audio files, and the receiver may be used for incoming calls. According to an embodiment, the receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., electronic device 102) directly (e.g., via a wired connection) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., electronic device 102) directly (e.g., via a wired connection) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., electronic device 102, electronic device 104, or server 108) and performing communication via the established communication channel. The communication module 190 may include one or more CPs that are operable independently from the processor 120 (e.g., the AP and support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules 192, 194 may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules 192, 194 may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from a device separate from the electronic device 101 (e.g., electronic device 102, 104). According to an embodiment, the antenna module 197 may include one or more antennas, and, at least one of the one or more antennas of the antenna module 197 may be appropriate for a communication scheme used in a communication network, such as the first network 198 or the second network 199. The one or more antennas of the antenna module 197 may be selected, for example, by the communication module 190 (e.g., wireless communication module 192, wired communication module 194) to perform data communication or power transmission/reception such that a data signal or a power signal may be transmitted or received between the electronic device 101 and an external electronic device (e.g., electronic device 102, 104, server 108) via the selected at least one antenna.

At least some of the above-described components may be coupled mutually to communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type from, the electronic device 101. According to an embodiment, all or some of operations to be executed at the electronic device 101 may be executed at one or more of the electronic devices 102, 104, or the server 108. For example, when the electronic device 101 should perform a function or a service automatically, or in response to a request from a user or another device, the electronic device 101, instead of, or in addition to, executing the function or the service, may request the one or more external electronic devices (e.g., electronic device 102, 104, server 108) to perform at least part of the function or the service. The one or more external electronic devices receiving the request may perform at least part of the function or the service requested, or an additional function or an additional service related to the request, and transfer a result of the performing to the electronic device 101. The electronic device 101 may provide the result, with or without further processing of the result provided by the one or more external electronic devices, as at least part of a reply to the request. A cloud computing, distributed computing, or client-server computing technology may be used, for example, to perform at least part of the function or the service requested, or the additional function or service related to the request.

Figure 2:
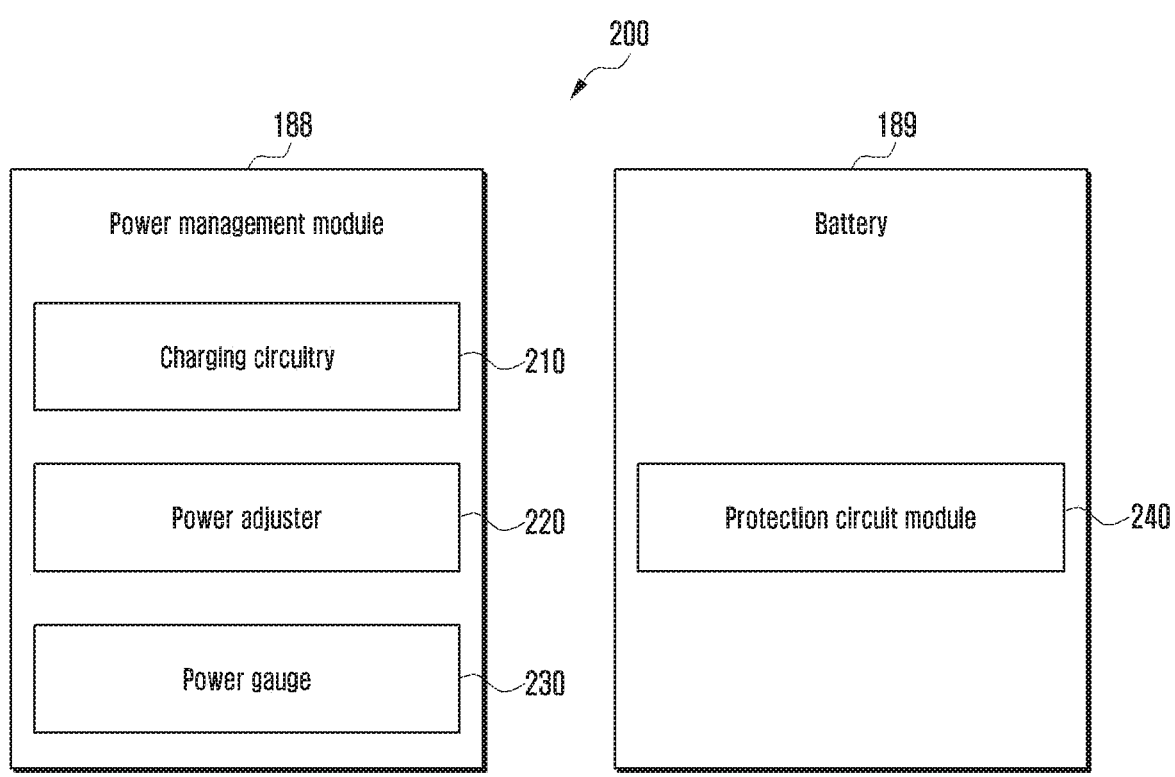
FIG. 2 is a block diagram illustrating configurations of a power management module and a battery of an electronic device according to various embodiments of the disclosure.

FIG. 2 is a block diagram 200 illustrating the power management module 188 and the battery 189 according to various embodiments of the disclosure.

Referring to FIG. 2, the power management module 188 may include charging circuitry 210, a power adjuster 220, or a power gauge 230. The charging circuitry 210 may charge the battery 189 by using power supplied from a power source disposed external to the electronic device 101. According to an embodiment, the charging circuitry 210 may select a charging scheme (e.g., normal charging or quick charging) based at least in part on a type of the external power source (e.g., a power outlet, a USB, or wireless charging), a magnitude of power capable of being supplied from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for one or more of the components included in the electronic device 101. According to an embodiment, the power adjuster 220 may be implemented in the form of a low drop out (LDO) regulator or a switching regulator. The power gauge 230 may measure state information associated with usage of the battery 189 (e.g., a capacity, a number of times of charging or discharging, a voltage, a temperature of the battery 189, etc.).

The power management module 188 may determine charging state information (e.g., lifetime, over voltage, low voltage, over current, over charge, over discharge, overheat, short, swelling, etc.) related to the charging of the battery 189 based at least in part on the measured state information associated with usage of the battery 189. According to an embodiment, the power management module 188 may determine charging state information using, for example, the charging circuitry 210, the power adjuster 220, or the power gauge 230. The power management module 188 may determine whether the state of the battery 189 is normal or abnormal based at least in part on the determined charging state information. When the state of the battery 189 is determined to be abnormal, the power management module 188 may adjust the charging of the battery 189 (e.g., reduce the charging current or voltage, or stop the charging). According to an embodiment, at least some of the functions of the power management module 188 may be performed by a control device external of the power management module 188 (e.g., processor 120).

The battery 189, according to an embodiment, may include a protection circuit module (PCM) 240. The PCM 240 may perform one or more various functions (e.g., a pre-cutoff function) to prevent a performance deterioration of, or damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least a portion of the charging state information or state information associated with usage of the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
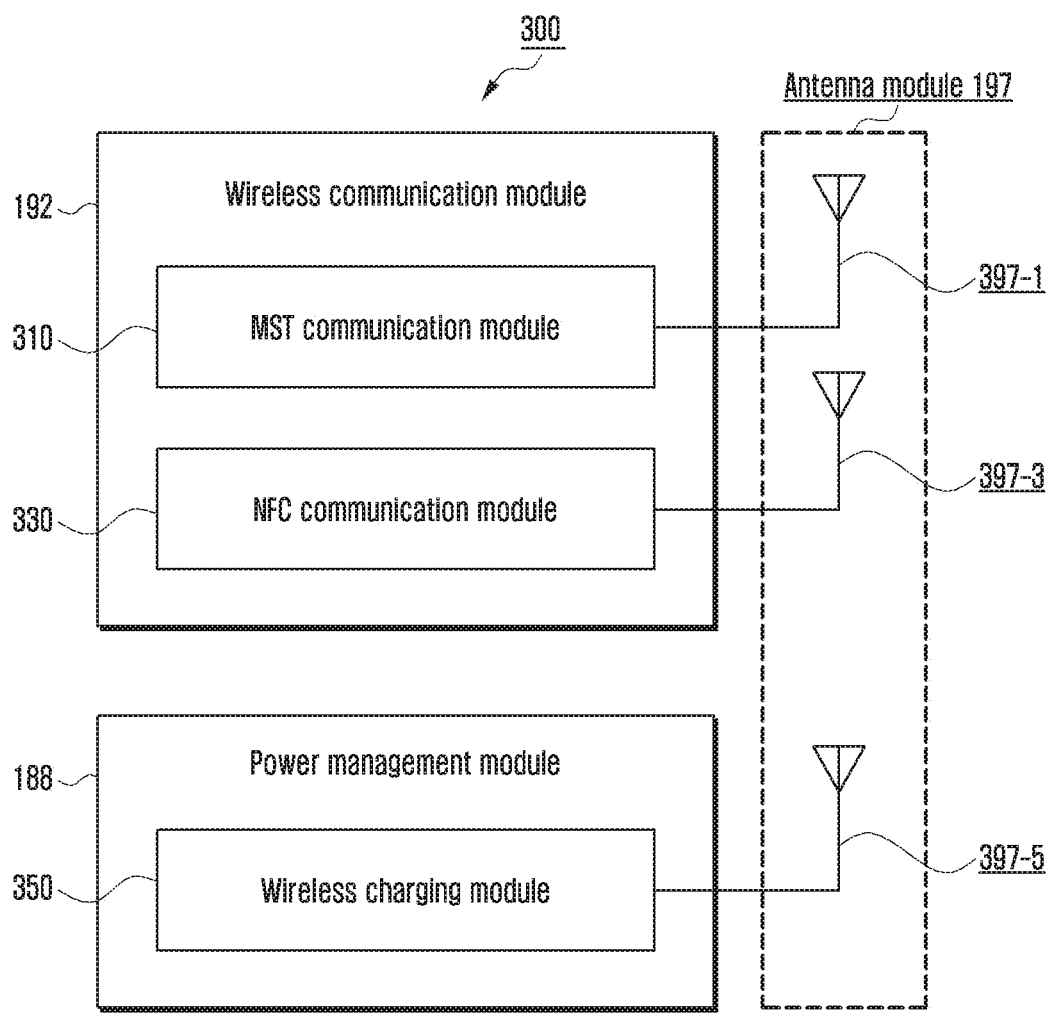
FIG. 3 is a block diagram illustrating configurations of a wireless communication module, a power management module, and an antenna module of an electronic device according to various embodiments of the disclosure.

FIG. 3 is a block diagram 300 illustrating the wireless communication module 192, the power management module 188, and the antenna module 197 of the electronic device 101 according to various embodiments of the disclosure.

Referring to FIG. 3, the wireless communication module 192 may include a magnetic secure transmission (MST) communication module 310 or a near-field communication (NFC) module 330, and the power management module 188 may include a wireless charging module 350. In such a case, the antenna module 197 may include a plurality of antennas that include an MST antenna 397-1 connected with the MST communication module 310, an NFC antenna 397-3 connected with the NFC communication module 330, and a wireless charging antenna 397-5 connected with the wireless charging module 350. For ease of description, the same components as those described in regard to FIG. 1 are briefly described or omitted from the description.

The MST communication module 310 may receive a signal including control information or payment information such as card information from the processor 120, generate a magnetic signal corresponding to the received signal, and then transfer the generated magnetic signal to the electronic device 102 (e.g., a point-of-sale (POS) device) via the MST antenna 397-1. To generate the magnetic signal, according to an embodiment, the MST communication module 310 may include a switching module (not shown) that includes one or more switches connected with the MST antenna 397-1, and the switching module may be controlled to change the direction of voltage or current supplied to the MST antenna 397-1 according to the received signal. The change of the direction of the voltage or current allows the direction of the magnetic signal (e.g., a magnetic field) emitted from the MST antenna 397-1 to change accordingly. When detected at the electronic device 102, the magnetic signal may cause an effect (e.g., a waveform) as the direction of the magnetic signal changes, similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to a server 108 (e.g., a payment server) via the second network 199.

The NFC communication module 330 may obtain a signal including control information or payment information such as card information from the processor 120 and transmit the obtained signal to the electronic device 102 via the NFC antenna 397-3. According to an embodiment, the NFC communication module 330 may also receive such a signal transmitted from the electronic device 102 via the NFC antenna 397-3.

The wireless charging module 350 may wirelessly transmit power to the electronic device 102 (e.g., a cellular phone or wearable device) via the wireless charging antenna 397-5, or wirelessly receive power from the electronic device 102 (e.g., a wireless charging device). The wireless charging module 350 may support one or more of various wireless charging schemes including, for example, a magnetic resonance scheme or a magnetic induction scheme. The wireless charging module 350 may be a component included in the charging circuitry 210.

According to an embodiment, one or more of the MST antenna 397-1, the NFC antenna 397-3, or the wireless charging antenna 397-5 may share at least a part of a radiator. For example, the radiator of the MST antenna 397-1 may be used as the radiator of the NFC antenna 397-3 or the wireless charging antenna 397-5, or vice versa. In such a case, the antenna module 197 may include a switching circuit (not shown) adapted to selectively connect (e.g., close) or disconnect (e.g. open) at least part of a radiator corresponding to one or more of the antennas 397-1, 397-3, or 397-5 with the wireless communication module 192 including the MST communication module 310 or the NFC communication module 330 or the power management module 188 including the wireless charging module 350. For example, when the electronic device 101 is operating in a state that uses a wireless charging function, the NFC communication module 330 or the wireless charging module 350 may control the switching circuit to temporarily disconnect at least one portion of the radiators shared by the NFC antenna 397-3 and the wireless charging antenna 397-5 from the NFC antenna 397-3 and to connect the at least one portion of the radiators with the wireless charging antenna 397-5.

According to an embodiment, at least one function of the MST communication module 310, the NFC communication module 330, or the wireless charging module 350 may be controlled by an external processor (e.g., processor 120). According to an embodiment, at least one specified function (e.g., a payment function) of the MST communication module 310 or the NFC communication module 330 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

Although FIG. 3 depicts the MST communication module 310, the NFC communication module 330, and the wireless charging module 350 as being connected to the respective antennas, it may also be possible for at least two of the modules to be connected to one antenna. For example, the MST communication module 310 and the wireless charging module 350 may connect to the same coil antenna for transmitting or receiving an MST signal or transmitting or receiving power wirelessly.

Figure 4A:
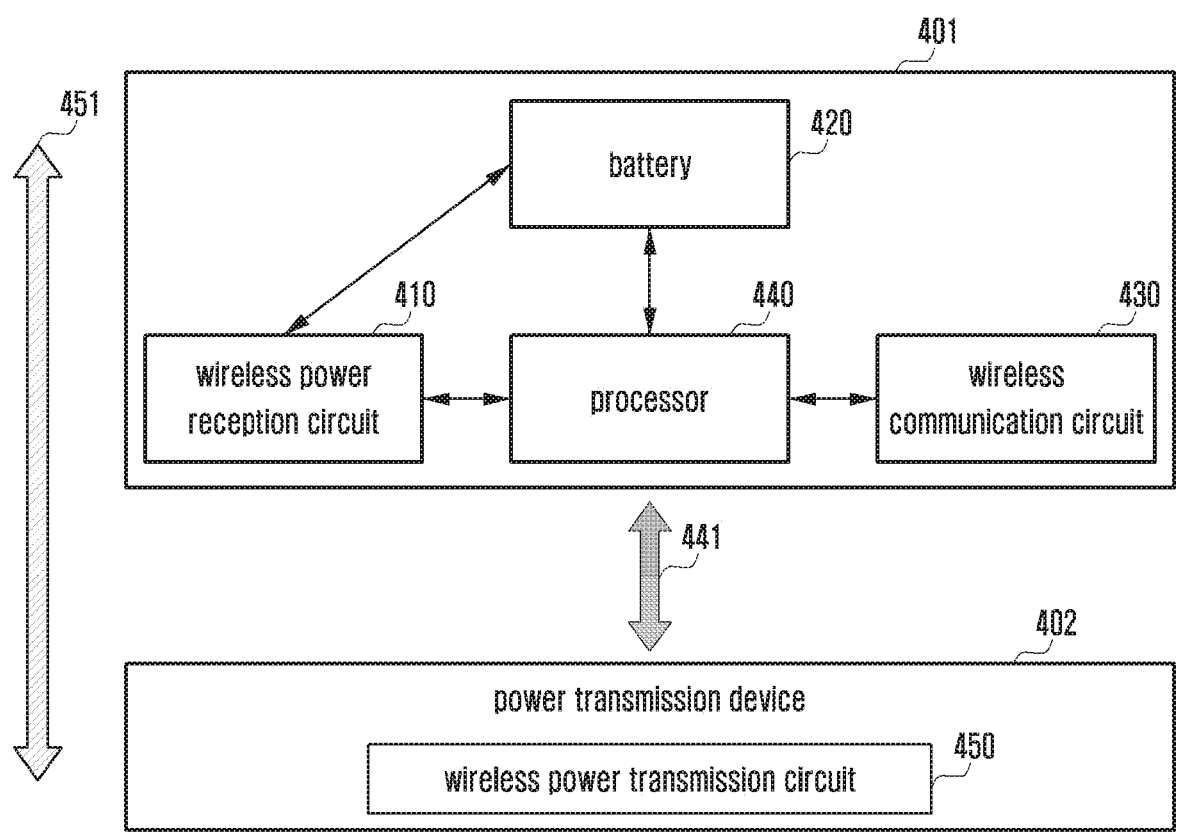
FIGS. 4A to 4C are diagrams for explaining wireless power transfer from external electronic devices to electronic devices according to various embodiments of the disclosure.

FIG. 4A is a diagram illustrating an electronic device and a power transmission device for supplying power wirelessly to the electronic device according to various embodiments of the disclosure.

According to various embodiments of the disclosure, a first electronic device 401 may receive power from a first power transmission device 402 (e.g., electronic device 102). When the first power transmission device 402 is located close to the first electronic device 401 (e.g., within a predetermined distance), the first power transmission device 402 may supply power to the first electronic device 401 wirelessly.

According to various embodiments of the disclosure, the first power transmission device 402 may transmit power to the first electronic device 401 according to the standard established by the wireless power consortium (WPC). The power transmission device 402 and the first electronic device 401 may exchange data via the power line established therebetween. The first power transmission device 402 and the first electronic device 401 may transmit/receive data on a first communication channel 441 established using a partial band of the wireless power transfer frequency band. The first electronic device 401 and the first power transmission device 402 may exchange various data including wireless charging-related information, identity information of the first power transmission device 402, identity information of the first electronic device 401, authentication information of the first power transmission device 402, charging mode switching information of the first power transmission device 402, and charging-related information including data indicative of wireless power reception status through the first communication channel 441. The data being transmitted on the first communication channel 441 may be generated in the form of a packet encrypted in one of various encryption algorithms.

According to various embodiments of the disclosure, the first communication channel 441 may be a communication channel established for in-band communication using a partial band of the wireless power transfer frequency band. It may be possible to transmit/receive data via coils configured for wireless power transmission/reception.

According to various embodiments of the disclosure, the bandwidth assigned to the first communication channel 441 may be narrower than that assigned to other communication schemes. The first communication channel 441 may support a data rate in the range from 20 to 250 bytes/sec (e.g., about 250 Byte/sec for ASK-coded data from the first electronic device 401 to the first power transmission device 402 and about 20 Byte/sec for FSK-coded data from the first power transmission device 402 to the first electronic device 401) and, in the case of using the first communication channel 441, the relatively low data rate may disrupt smooth data transmission/reception.

According to various embodiments of the disclosure, the first electronic device 401 and the first power transmission device 402 may communicate data using a second communication channel 451 instead of the first communication channel 441. The second communication channel 451 may be a communication channel for use in the out-of-band (OOB) communication scheme for short-range wireless data communication (e.g., Bluetooth™, NFC, and Wi-Fi) between the first electronic device 401 and the first power transmission device 402. According to various embodiments of the disclosure, the bandwidth assigned to the second communication channel 451 may be broader than that assigned to the first communication channel 441. The first electronic device 401 and the first power transmission device 402 may communicate data over the second communication channel 451. The first electronic device 401 and the first power transmission device 402 may exchange various types of data including wireless charging-related information, identity information of the first power transmission device 402, identity information of the first electronic device 401, authentication information of the first power transmission device 402, and charging mode switching information of the first power transmission device 402 through the second communication channel 451.

According to various embodiments of the disclosure, the first electronic device 401 may include a wireless power reception circuit 410 (e.g., charging circuitry 210), a battery 420 (e.g., battery 189), a wireless communication circuit 430 (e.g., wireless communication module 192), and a processor 440 (e.g., processor 120).

According to various embodiments of the disclosure, the wireless power reception circuit 410 may receive power from the first power transmission device 402 to charge the battery 420. The wireless power reception circuit 410 may receive power from the first power transmission device 402 according to various protocols including a protocol specified in the WPC standard and power matters alliance (PMA) standard. In addition, according to various embodiments of the disclosure, the wireless power reception circuit 410 may communicate data with the first power transmission device 402 through the first communication channel 441.

According to various embodiments of the disclosure, the wireless communication circuit 430 may communicate data with the first power transmission device 402 using a short-range wireless communication scheme (e.g., Bluetooth™, Wi-Fi, NFC, etc.). The wireless communication circuit 430 may communicate data with the first power transmission device 402 through the second communication channel 451.

According to various embodiments of the disclosure, the processor 440 may receive a signal for establishing the second communication channel 451 from the first power transmission device 402 through the first communication channel 441. The processor 440 may transmit first identity information associated with the first electronic device 401 in response to receiving the signal for establishing the second communication channel 451 and then transmit a signal requesting for second identity information associated with the first power transmission device 402. The signal for establishing the second communication channel 451 may include an indicator indicating whether the first power transmission device 402 supports the second communication channel 451, address data of the first power transmission device 402 for the second communication channel 451, and information associated with the second communication channel 451. The data conveyed in the signal for establishing the second communication channel 451 may be encrypted in various manners (e.g., anonymized data packet (anonymous packet)).

According to various embodiments of the disclosure, the first identity information and the signal requesting for the second identity information may be transmitted to the first power transmission device 402 through the first communication channel 441.

The first identity information may include the identifier associated with the first electronic device 401, which is transmitted through the first communication channel 441. The second identity information may include the identity associated with the first power transmission device 402, which is transmitted through the first communication channel 441. There may be third identity information including the identifier associated with the first power transmission device 402, which is transmitted through the second communication channel 451. There may be fourth identity information including the identifier associated with the first electronic device 401, which is transmitted through the second communication channel 451.

The first identity information may be used for distinguishing the first electronic device 401 from other electronic devices. The processor 440 may transmit the first identity information along with the signal requesting the second identity information. According to an embodiment, the processor 440 may encrypt the first identity information using various schemes and transmit the encrypted first identity information to the first power transmission device 402. For example, the identity information may be anonymized into an anonymous packet. By encrypting the identity information to be transmitted, it is possible to prevent another electronic device (e.g., second electronic device 403) not connected to the first power transmission device 402 from ascertaining the first identity information associated with the first electronic device 401, thereby strengthening security.

According to various embodiments of the disclosure, the processor 440 may receive the second identity information from the first power transmission device 402 through the first communication channel 441.

According to various embodiments of the disclosure, the first identity information or the second identity information may include an identifier (ID) of the device (e.g., model name and identity information of the electronic device), charging operation mode information (e.g., transmission power, reception power, voltage, current, and operation mode switching information), internal mobile equipment identity (IMEI), communication circuitry identity information (e.g., identity information for establishing the second communication channel 451, address data of the first power transmission device 402 for the second communication channel 451, information associated with the second communication channel 451, and media access control (MAC) address), and a public key for encryption.

According to various embodiments of the disclosure, the processor 440 may activate the second communication channel 451 using the second identity information. The processor 440 may control the first electronic device 401 to establish the second communication channel 451 with the first power transmission device 402 identified by the second identity information and to avoid establishing the second communication channel 451 with another external electronic device (e.g., second power transmission device 404). According to an embodiment, the first power transmission device 402 may establish or be controlled to establish the second communication channel 451 with the first electronic device 401 identified by the first identity information. For example, the first power transmission device 402 may be controlled to establish the second communication channel 451 with the first electronic device 401 identified by the first identity information and avoid establishing a connection with another electronic device (e.g., second electronic device 403). Through the above operation, it is possible to avoid occurrence of a cross-connection.

According to various embodiments of the disclosure, the processor 440 may receive power reception mode switching data from the first power transmission device 402 through the second communication channel 451. The reception power mode switching data may include data required for switching from a first power reception mode to a second power reception mode. The power reception mode switching data may be the data for authenticating the first power transmission device 402 before power reception mode switching. The second power reception mode may have a wireless transmit power level higher than that of the first power reception mode. When the first electronic device 401 is operating in the second power reception mode, the battery 420 may charge faster than when the first electronic device 401 is in the first power reception mode.

According to various embodiments of the disclosure, the processor 440 may receive the power reception mode switching data including data indicating whether the first power transmission device 402 supports the second power reception mode or data for determining whether the first power transmission device 402 is a genuine product through the second communication channel 451. The processor 440 may determine whether to perform power reception mode switching based on the power reception mode switching data.

According to various embodiments of the disclosure, the processor 440 may receive the power reception mode switching data from the first power transmission device 402 through the first communication channel 441. The processor 440 may also receive the power reception mode switching data from the first power transmission device 402 through both the first and second communication channels 441 and 451.

According to various embodiments of the disclosure, the processor 440 may perform authentication for the first power transmission device 402 based on the data used to determine whether the first power transmission device 402 is a genuine product, which is included in the power reception mode switching data. The processor 440 may determine whether to perform power reception mode switching based on the authentication result for the first power transmission device 402. By way of example, the processor 440 may control the wireless power reception circuit 410 to switch from the first power reception mode to the second power reception mode when the first power transmission device 402 passes the authentication. By way of another example, the processor 440 may control the wireless power reception circuit 410 to remain in the first power reception mode when the first power transmission device 402 fails the authentication.

According to various embodiments of the disclosure, the processor 440 may transmit the data in the form of an anonymous data packet through the first communication channel 441. The anonymous data packet may be an encrypted packet. The processor 440 may encrypt the anonymous data packet and control the wireless power reception circuit 410 to transmit the encrypted data to the first power transmission device 402 through the first communication channel 441. It may be possible to use various encryption schemes for encrypting the data. The first electronic device 401 and the first power transmission device 402 may store data in a pre-agreed encryption/decryption scheme and, when encrypted anonymous data is received, the encrypted anonymous data may be decoded using the pre-agreed encryption/decryption scheme. The anonymous data may include one-time data (instant or disposable data) generated with a one-time random number. The anonymous data may be transmitted through the first communication channel 441 or the second communication channel 451. The processor 440 may check the anonymous data transmitted through the first communication channel 441 and the anonymous data transmitted through the second communication channel 451 to determine whether the anonymous data is generated with the same random number to identify the first power transmission device 402 connected through the first communication channel 441 with the first power transmission device 402 connected through the second communication channel 451.

According to various embodiments of the disclosure, the processor 440 may transmit first anonymous data through the first communication channel 441. The processor 440 may receive second anonymous data.

According to various embodiments of the disclosure, the processor 440 may ascertain the identity information of the device that has generated the second anonymous data from the second anonymous data and determine whether the ascertained identity information corresponds to the identity information of a pre-designated external electronic device (e.g., first power transmission device 402).

According to various embodiments of the disclosure, when the identity information ascertained from the second anonymous data corresponds to the identity information of the first power transmission device 402, the processor 440 may perform charging mode switching. According to various embodiments of the disclosure, the processor 440 may receive the second anonymous data through the first communication channel 441. The processor 440 may determine that the second anonymous data includes the identity information of the first power transmission device 402.

According to various embodiments of the disclosure, the processor 440 may ascertain the identity information associated with the device that has generated the second anonymous data from the second anonymous data and determine whether the ascertained identity information corresponds to the identity information of the pre-designated external electronic device.

According to various embodiments of the disclosure, when the second anonymous data includes the identity information associated with the first power transmission device 402, the processor 440 may transmit the first anonymous data to the first power transmission device 402 through the first communication channel 441.

According to various embodiments of the disclosure, the processor 440 of the first electronic device 401 may transmit the first anonymous data through the first communication channel 441. The processor of the first power transmission device 402 may check the first anonymous data to determine whether the first anonymous data includes the identity information of the first electronic device 401. The processor of the first power transmission device 402 may ascertain the identity information associated with the device that generated the first anonymous data from the first anonymous data and determine whether the ascertained identity information is identical to the identity information of a pre-designated electronic device (e.g., first electronic device 401. According to various embodiments of the disclosure, when the first anonymous data includes the identity information associated with the first electronic device 401, the processor of the first power transmission device 402 may transmit the second anonymous data to the first electronic device 401 through the first communication channel 441.

According to various embodiment of the disclosure, the data being communicated between the first electronic device 401 and the first power transmission device 402 through the first communication channel 441 may be anonymized so as not to be identified by other external electronic devices. For example, in the case where the encrypted data for establishing the second communication channel 451 between the first electronic device 401 and the first power transmission device 402 are communicated through the first communication channel 441, although other external electronic devices may receive the encrypted data, the other external electronic devices (e.g., not pre-designated devices) cannot decrypt the encrypted data; thus, it becomes impossible to establish the second communication channel 451 between the first electronic device 401 and any of the other external electronic devices.

According to various embodiments of the disclosure, in the case where the data communicated through the first communication channel 441 between the first electronic device 401 and the first power transmission device 402 is anonymized along with the identity information for use in configuring (or modifying) the charging mode through the first communication channel 441 between the first electronic device 401 and the first power transmission device 402, the other external electronic devices cannot ascertain the identity information needed to configure the charging mode. According to various embodiments of the disclosure, the processor 440 may detect a transition among power transfer phases. For example, the processor 440 may monitor the wireless power reception circuit 410 of the first electronic device 401 to detect phase transition in the power transfer mode. The power transfer mode may include a ping detection phase for detecting proximity between the first power transmission device 402 and the first electronic device 401, a configuration phase for establishing a connection between the first power transmission device 402 and the first electronic device 401, and a power transfer phase for transmitting power from the first power transmission device 402 to the first electronic device 401. The processor 440 may detect a phase transition from a power reception state to a power reception end state and release the second communication channel 451. By way of example, the processor 440 may monitor the first communication channel 441 to detect data (e.g., ~~(CEP)) and, when such data is not received, the power transfer end state to release the second communication channel 451 may be assumed. By way of another example, the processor 440 may monitor the received power level at the wireless communication circuit 430. When it is determined that the received power level is equal to or lower than a predetermined power level, the processor 440 may control the wireless communication circuit 430 to release the second communication channel 451. The above-described operation makes it possible to avoid a cross-connection caused by maintaining the second communication channel in a situation where the distance between the first electronic device 401 and the first power transmission device 402 becomes too far to perform wireless power transfer while the first power transmission device 402 is transferring power wirelessly to another electronic device (e.g., second electronic device 403).

According to various embodiments of the disclosure, the first power transmission device 402 may include a wireless power transmission circuit 450 for wirelessly transmitting power to other electronic devices (e.g., first electronic device).

Figure 4B:
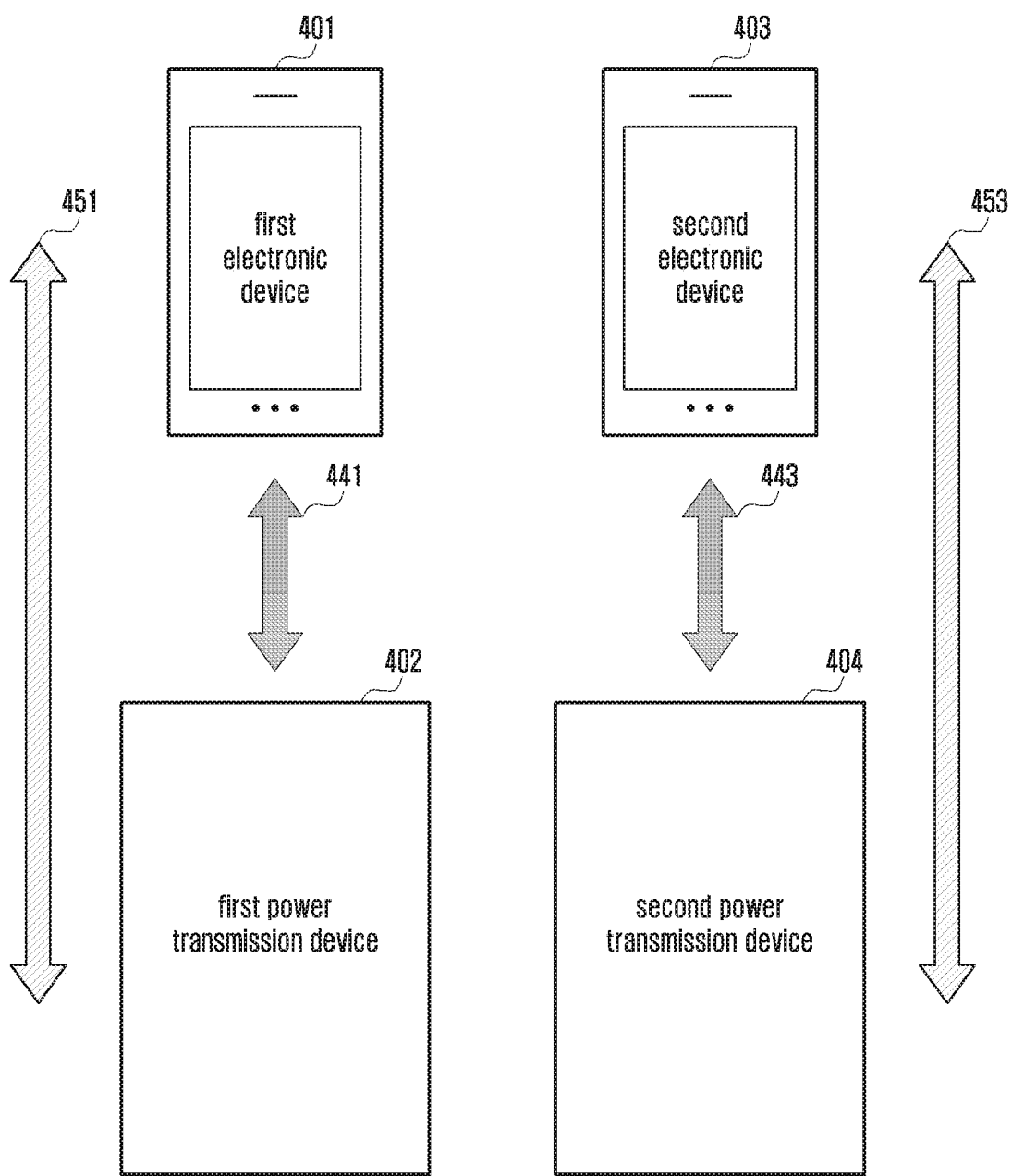
Figure 4C:
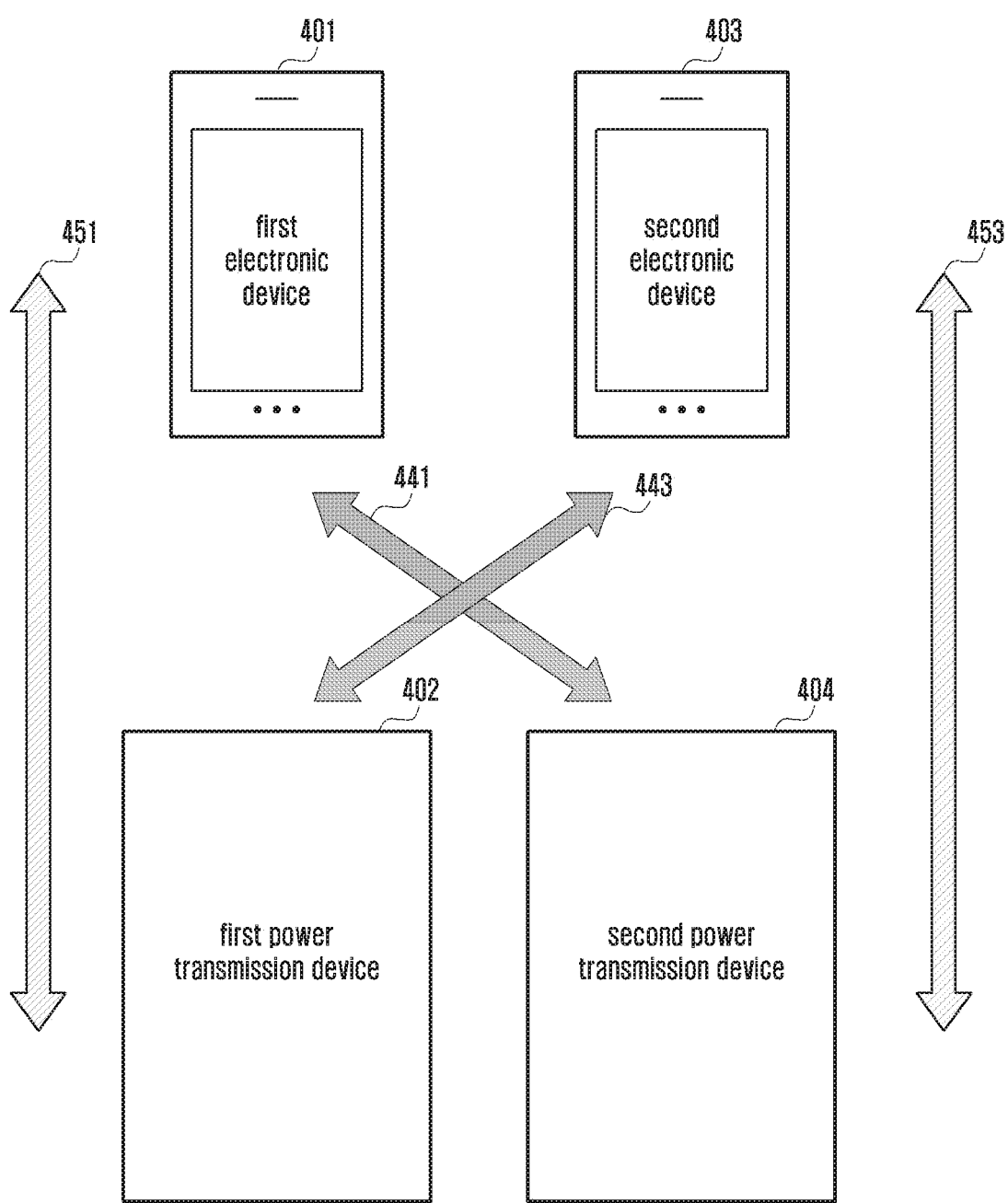

FIGS. 4B and 4C are diagrams illustrating wireless power transfer operations between electronic devices and power transmission devices according to various embodiments of the disclosure.

FIGS. 4B and 4C depict situations with the first electronic device 401, the first power transmission device 402, a second electronic device 403, and a second power transmission device 404.

According to various embodiment of the disclosure, the first electronic device 401 may receive power from the first power transmission device 402. When the first power transmission device 402 is located close to the first electronic device 401 (e.g., within a predetermined distance), the first power transmission device 402 may supply power to the first electronic device 401 wirelessly.

According to various embodiments of the disclosure, the first power transmission device 402 may transmit power to the first electronic device 401 according to the standard established by the WPC. The first power transmission device 402 and the first electronic device 401 may exchange data via the wireless power line established therebetween. As illustrated in FIG. 4B, the first power transmission device 402 and the first electronic device 401 may transmit/receive data on a first communication channel 441 established using a partial band of the wireless power transfer frequency band. The first electronic device 401 and the first power transmission device 402 may exchange various types of data including wireless charging-related information, identity information associated with the first power transmission device 402, identity information associated with the first electronic device 401, authentication information associated with the first power transmission device 402, charging mode switching information associated with the first power transmission device 402, and charging-related information including data indicative of wireless power reception status or success/failure through the first communication channel 441. The data being transmitted on the first communication channel 441 may be generated in the form of a packet encrypted in one of various encryption algorithms.

According to various embodiments of the disclosure, the first communication channel 441 may be a communication channel established for in-band communication using a partial band of the wireless power transfer frequency band.

According to various embodiments of the disclosure, the bandwidth assigned to the first communication channel 441 may be narrower than that assigned to other communication schemes. In the case of using the first communication channel 441 for data communication, the relatively low data rate may disrupt smooth data transmission/reception.

According to various embodiments of the disclosure, the first electronic device 401 and the first power transmission device 402 may communicate data using a second communication channel 451 instead of the first communication channel 441. The second communication channel 451 may be a communication channel for use in the OOB communication scheme for short-range wireless data communication (e.g., Bluetooth™, NFC, and Wi-Fi) between the first electronic device 401 and the first power transmission device 402. According to various embodiments of the disclosure, the bandwidth assigned to the second communication channel 451 may be broader than that assigned to the first communication channel 441. The first electronic device 401 and the first power transmission device 402 may exchange various types of data including wireless charging-related information, identity information associated with the first power transmission device 402, identity information associated with the first electronic device 401, authentication information associated with the first power transmission device 402, and charging mode switching information associated with the first power transmission device 402 through the second communication channel 451.

According to various embodiments of the disclosure, the second electronic device 403 may receive power from the second power transmission device 404. When the second power transmission device 404 is located close to the second electronic device 403 (e.g., within a predetermined distance), the second power transmission device 404 may supply power to the second electronic device 403 wirelessly.

According to various embodiments of the disclosure, the second power transmission device 404 may transmit power to the second electronic device 403 according to the standard established by WPC. The second power transmission device 404 and the second electronic device 403 may exchange data on the wireless power line established therebetween. As illustrated in FIG. 4B, the second power transmission device 404 and the second electronic device 403 may transmit/receive data via a third communication channel 443 established using a partial band of the wireless power transfer frequency band. The second electronic device 403 and the second power transmission device 404 may exchange various types of data including wireless charging-related information, identity information associated with the second power transmission device 404, identity information associated with the second electronic device 403, authentication information associated with the second power transmission device 404, charging mode switching information associated with the second power transmission device 404, and charging-related information including data indicative of wireless power reception status through the third communication channel 443. The data transmitted over the third communication channel 443 may be generated in the form of a packet encrypted in one of various encryption algorithms.

According to various embodiments of the disclosure, the third communication channel 443 may be a communication channel established for in-band communication using a partial band of the wireless power transfer frequency band. The third communication channel 443 may be a communication channel established according to the same communication protocol as that used for the first communication channel. It may be possible to transmit/receive data via coils configured for wireless power transmission/reception.

According to various embodiments of the disclosure, the bandwidth assigned to the third communication channel 443 may be narrower than that assigned to other communication schemes. The third communication channel 443 may support a data rate in the range from 20 to 250 bytes/sec (e.g., about 250 Byte/sec for ASK-coded data from the second electronic device 403 to the second power transmission device 404 and about 20 Byte/sec for FSK-coded data from the second power transmission device 404 to the second electronic device 403) and, in the case of using the third communication channel 443, the relatively low data rate may disrupt smooth data transmission/reception.

According to various embodiments of the disclosure, the second electronic device 403 and the second power transmission device 404 may communicate data using a fourth communication channel 453 instead of the third communication channel 443. The fourth communication channel 453 may be a communication channel for use in the OOB communication scheme for short range wireless data communication (e.g., Bluetooth™, NFC, and Wi-Fi) between the second electronic device 403 and the second power transmission device 404. The fourth communication channel 453 may be a communication channel established using the same communication scheme as that used for the second communication channel 451.

According to various embodiments of the disclosure, the bandwidth assigned to the fourth communication channel 453 may be broader than that assigned to the third communication channel 443. The second electronic device 403 and the second power transmission device 404 may communicate data over the fourth communication channel 453. The second electronic device 403 and the second power transmission device 404 may exchange various types of data including wireless charging-related information, identity information associated with the second power transmission device 404, identity information associated with the second electronic device 403, authentication information associated with the second power transmission device 404, and charging mode switching information associated with the second power transmission device 404 through the fourth communication channel 453.

According to various embodiments of the disclosure, the first electronic device 401 and the first power transmission device 402 may communicate data using the first and second communication channels 441 and 451. The second electronic device 403 and the second power transmission device 404 may communicate data using the third and fourth communication channels 443 and 453.

According to various embodiments of the disclosure, a power reception device (e.g., first electronic device 401 and second electronic device 403) may connect to a power transmission device (e.g., first power transmission device 402 and second power transmission device 404) using the first and second communication channels 441 and 451 for data communication.

In the case where the power reception devices are located close to each other, an electronic device connected through the first communication channel 441 and an electronic device connected through the second communication channel 441 may differ from each other. By way of the example, as illustrated in FIG. 4C, the first electronic device 401 may connect to the second power transmission device 404 through the first communication channel 441 and to the first power transmission device 402 via the second communication channel 451. It may also be possible that the second electronic device 403 connects to the first power transmission device 402 through the third communication channel 443 and to the second power transmission device 404 through the fourth communication channel 453.

According to various embodiments of the disclosure, a cross-connection may occur when electronic devices are connected through the first and second communication channels to two different power reception devices. If a cross-connection occurs, a problem in controlling wireless power supply may arise.

According to various embodiments of the disclosure, the first and second power transmission devices 402 and 404 may be integrated into a single power transmission device. In the case where the first and second power transmission devices 402 and 404 are integrated into a single power transmission device, the first power transmission device 402 may be implemented as a first power transmission circuit along with communication circuits for establishing, respectively, the first and second communication channels 441 and 451, and the second power transmission device 404 may be implemented as a second power transmission circuit along with communication circuits for establishing, respectively, the third and fourth communication channels 443 and 453.

If a cross-connection occurs such that the first electronic device 401 receives power control information from the first transmission device 402 through the second communication channel 451 in the course of receiving power from the second power transmission device 404 through the first communication channel 441, a problem may occur in controlling wireless power supply. Hereinafter, a description is made of an electronic device and an operation method of the electronic device for avoiding occurrence of a cross-connection.

According to various embodiments of the disclosure, the processor 440 may request and monitor the first or second communication channel 441, 451 for second identity information associated with the first power transmission device 402 to avoid an occurrence of a cross-connection while the first electronic device 401 is connected to the first power transmission device 402 through the first and second communication channels 441, 451. For example, the processor 440 may request for the second identity information associated with the first power transmission device 402 through the first or second communication channel 441, 451 at a predetermined time interval.

According to various embodiments of the disclosure, the processor 440 may determine whether the same electronic device is connected through the first and second communication channels 441, 451. The processor 440 may determine whether to maintain the second communication channel 451 based on whether the electronic device connected through the first communication channel 441 is the same electronic device connected through second communication channel 451.

According to various embodiments of the disclosure, the processor 440 may receive the second identity information from the first power transmission device 402 through the first communication channel 441. The second identity information may be used for distinguishing the first power transmission device 402 from other electronic devices. According to an embodiment, the processor 440 may receive the second identity information needed for establishing the second communication channel 451 through the first communication channel 441, and, when identity information associated with the first power transmission device 402 is previously stored at the first electronic device 401, this operation may be skipped.

According to various embodiments of the disclosure, the processor 440 may receive third identity information through the second communication channel 451. The third identity information may include the identity information associated with the first power transmission device 402, which is transmitted through the second communication channel 451.

The processor 440 may determine whether the third identity information matches the identity information received from the first power transmission device 402 based on at least the second identity information received through the first communication channel 441. The processor 440 may compare the second identity information and the third identity information to determine whether the second identity information and third identity information are the same. The processor 440 may determine whether the third identity information matches the identity information received from the first power transmission device 402 based on the coincidence between the second identity information and third identity information.

According to various embodiments of the disclosure, when the third identity information matches the identity information received from the first power transmission device 402, the processor 440 may maintain the first and second communication channels 441 and 451. The processor 440 may continue receiving power wirelessly from the first power transmission device 402. When the third identity information matches the identity information received from the first power transmission device 402, the processor 440 may transmit to the first power transmission device 402 a signal (e.g., id_correct packet) indicating that the first identity information matches the second identity information through the first communication channel 441.

According to various embodiments of the disclosure, when the second identity information differs from the third identity information, the processor 440 may determine that the third identity information is received from an electronic device other than the first power transmission device 402 (e.g., second power transmission device 404) or that the second identity information is received from a device other than the first power transmission device 402. When the second identity information and the third identity information are different from each other, a cross-connection may occur.

According to various embodiments of the disclosure, when it is determined that the third identity information is received from an electronic device other than the first power transmission device 402 (e.g., second power transmission device 404) or that the second identity information is received from an electronic device other than the first transmission device 402, the processor 440 may release the second communication channel 451. The processor 440 may release the connection to the second power transmission device 404 by releasing the second communication channel 451. When it is determined that the third identity information is received from an electronic device (e.g., second power transmission device 404) or that the second identity information is received from an electronic device other than the first transmission device 402, the processor 440 may transmit a signal indicating that the second identity information and the third identity information are different from each other to the second power transmission device 404 through the first communication channel 441. Upon receipt of the signal indicating that the second identity information and the third identity information are different from each other, the second power transmission device 404 may perform an operation for establishing a connection to the second electronic device 403 through the fourth communication channel 453.

According to various embodiments of the disclosure, the processor 440 may perform the operation for establishing a connection with the second power transmission device 404 through the third communication channel 443 to avoid occurrence of a cross-connection. The processor 440 may receive fourth identity information from the second power transmission device 404 through the fourth communication channel 453. The fourth identity information may be the identity information for distinguishing the second power transmission device 404 from other electronic devices.

According to various embodiments of the disclosure, the processor 440 may establish a connection with the first power transmission device 402 through the second communication channel 451 based on the second identity information.

According to various embodiments of the disclosure, when it is determined that the third identity information is received from the first power transmission device 402 and that the second identity information is received from the second power transmission device 404 rather than from the first power transmission device 402, the processor 440 may transmit a signal requesting to discontinue power transmission through the first communication channel 441. When it is determined that the third identity information is received from the second power transmission device 404 rather than from the first power transmission device 402 and that the second identity information is received from the first power transmission device 402, the processor 440 may continue receiving power from the first power transmission device 402 by maintaining the connection through the first communication channel 441, and release the connection through the second communication channel 451. It may be possible to establish a connection with the first power transmission device 402 through the second communication channel 451.

According to various embodiments of the disclosure, although the description is made of the case where the processor 440 determines whether the second identity information received through the first communication channel 441 is identical to the third identity information received through the second communication channel 451, it may also be possible for the first power transmission device 402 to make such a determination instead of the processor 440. For example, the processor 440 may transmit the first identity information to the first power transmission device 402 through the first communication channel 441 and the fourth identity information to the first power transmission device 402 through the second communication channel 451. The first power transmission device 402 may compare the first identity information received through the first communication channel 441 and the fourth identity information received through the second communication channel 451 to determine whether an electronic device connected through the first communication channel 441 is the same electronic device as the electronic device that is connected through the second communication channel 451.

According to various embodiments of the disclosure, the processor 440 of the first electronic device 401 may transmit the first identity information through the first communication channel 441. The first power transmission device 402 may transmit the first identity information received through the first communication channel 441 or data related to the first identity information through the second communication channel 451. The first electronic device 401 may compare the data received through the second communication channel 451 with the first identity information. The first electronic device 401 may determine whether the electronic devices connected through the first and second communication channels 441, 451 are the same device. For example, when the first electronic device 401 transmits the first identity information through the first communication channel 441 and receives the first identity information or related information from the first power transmission device 402 through the second communication channel 451, the first electronic device 401 may determine that it has connected to the first power transmission device 402 through both the first and second communication channels 441 and 451.

According to various embodiments of the disclosure, although the description is directed to the case where the first electronic device 401 transmits the first identity information through the first communication channel 441 and receives the first identity information or related data through the second communication channel 451 to determine whether the electronic devices connected through the first and second communication channels are the same device, the disclosure is not limited thereto. For example, it may also be possible for the first power transmission device 402 to transmit the second identity information through the first communication channel 441 and receive second identity information or data related to the second identity information through the second communication channel 451 to determine whether the electronic devices connected through the first and second communication channels 441, 451 are the same device.

According to various embodiments of the disclosure, although the description is directed to the case where the processor 440 or the first power transmission device 402 receives the first or second identity information through the first communication channel 441, it may also be possible to receive the third or fourth identity information through the second communication channel 451 rather than the first communication channel 441.

Figure 5:
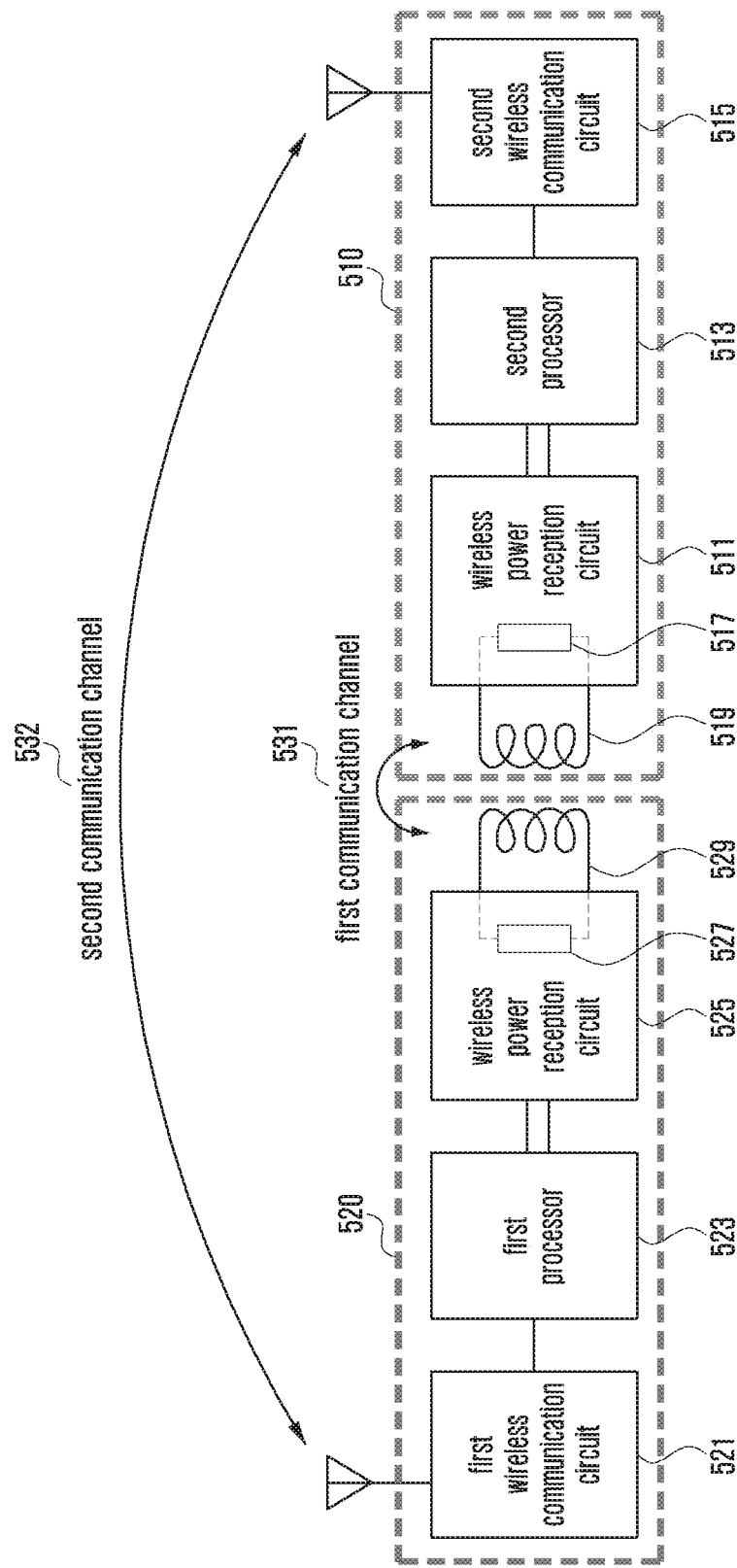
FIG. 5 is a diagram illustrating an electronic device and an external electronic device communicating data through a first and second channel according to an embodiment of the disclosure.

FIG. 5 is a diagram illustrating an electronic device and an external electronic device communicating data through a first and second channel according to an embodiment of the disclosure.

FIG. 5 depicts an electronic device 510 (e.g., electronic device 101, first electronic device 401, and second electronic device 403) and an external electronic device 520 (e.g., first power transmission device 402 and second power transmission device 404).

According to various embodiments of the disclosure, the external electronic device 520 may include a first wireless communication circuit 521, a first processor 523, and a wireless power transmission circuit 525.

According to various embodiment of the disclosure, the wireless power transmission circuit 525 may transmit power to the electronic device 510 wirelessly. The wireless power transmission circuit 525 may transmit power to the electronic device 510 using various methods including a magnetic induction power transfer method (e.g. Qi method and PMA method) and a resonance inductive power transfer method.

According to various embodiments of the disclosure, the wireless power transmission circuit 525 may communicate data with the electronic device 510 through a first communication channel 531 established using a partial band of a power transmission frequency band. The wireless power transmission circuit 525 may include a communication circuit 527 for controlling the operations of establishing and releasing the first communication channel 531 using a coil 529.

According to various embodiments of the disclosure, the first wireless communication circuit 521 may communicate data with the electronic device 510 through a second communication channel 532 established via a short-range wireless communication protocol (e.g., Wi-Fi, Bluetooth™, NFC, etc.).

According to various embodiments of the disclosure, the first processor 523 may control the operations of the wireless power transmission circuit 525 and the first wireless communication circuit 521. The first processor 523 may control the wireless power transmission circuit 525 to transmit first identity information associated with the external electronic device 520 through the first communication channel 531 in response to a request from the electronic device 510. The first processor 523 may control the first wireless communication circuit 521 to transmit second identity information through a second communication channel 532 in response to a request from the electronic device 510.

According to various embodiments of the disclosure, the electronic device 510 may include a wireless power reception circuit 511 (e.g., wireless power reception circuit 410), a second processor 513 (e.g., processor 440), and a second wireless communication circuit 515 (e.g., wireless communication circuit 430).

According to various embodiments of the disclosure, the wireless power reception circuit 511 may receive power wirelessly transmitted by the external electronic device 520. The wireless power reception circuit 511 may receive power from the external electronic device 520 using various methods including a magnetic induction power transfer method (e.g. Qi method and PMA method) and a resonance inductive power transfer method.

According to various embodiments of the disclosure, the wireless power reception circuit 511 may communicate data with the external electronic device 520 through the first communication channel 531 established using a partial band of a power transmission frequency band. The wireless power reception circuit 511 may include a communication circuit 517 for controlling the operations of establishing and releasing the first communication channel 531 using a coil 519.

According to various embodiments of the disclosure, the second wireless communication circuit 515 may communicate data with the external electronic device 520 through the second communication channel 532 established via a short-range wireless communication protocol (e.g., Wi-Fi, Bluetooth™, NFC, etc.).

According to various embodiments of the disclosure, the second processor 513 may control the operations of the wireless power reception circuit 511 and the second wireless communication circuit 515. The second processor 513 may control the wireless power reception circuit 511 to receive the first identity information through the first communication channel 531. The second processor 513 may control the second wireless communication circuit 515 to receive the second identity information through the second communication channel 532.

Figure 6:
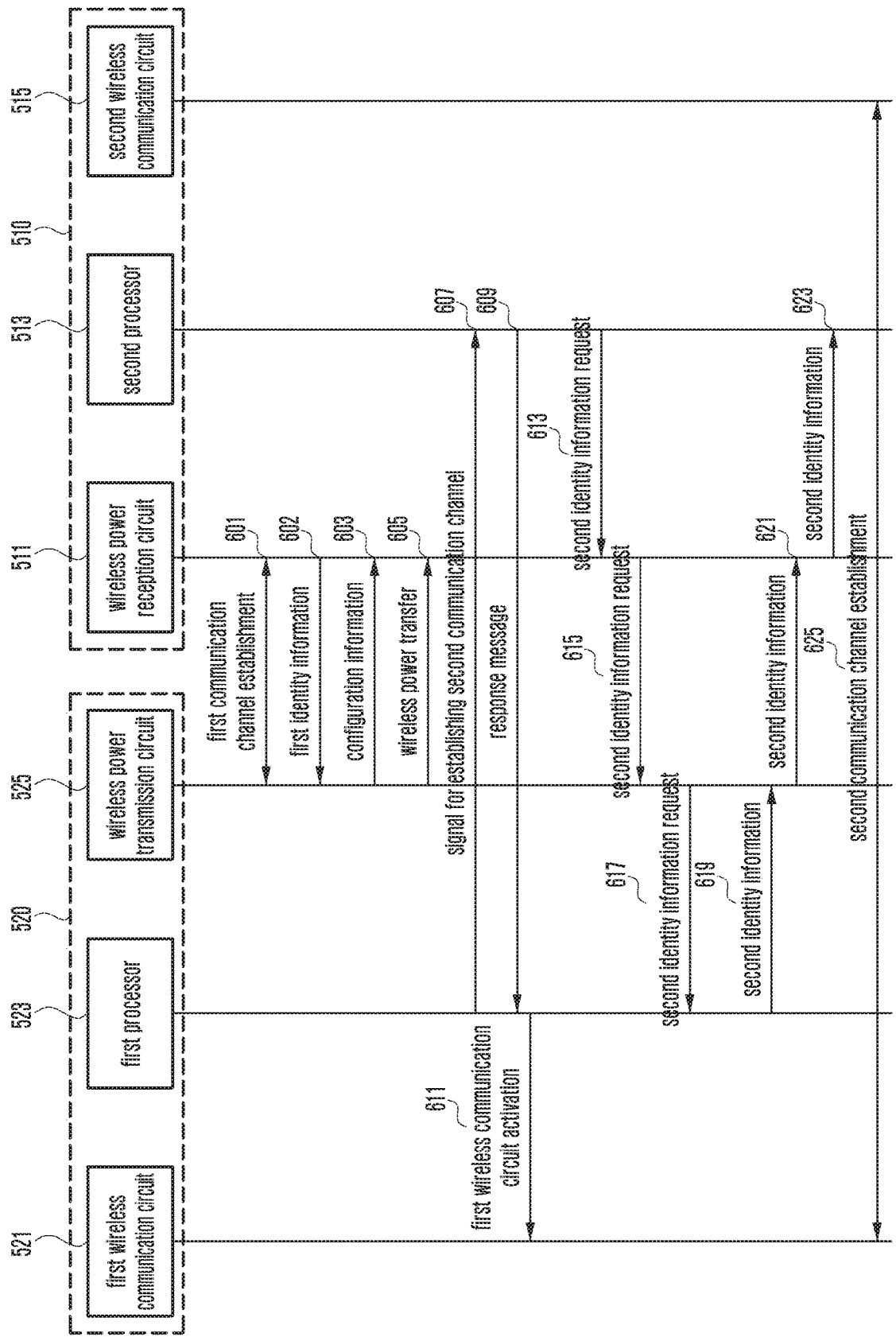
FIG. 6 is a signal flow diagram illustrating a procedure for an electronic device to establish a second communication channel according to various embodiments of the disclosure.

FIG. 6 is a signal flow diagram illustrating a procedure for an electronic device to establish a second communication channel according to various embodiments of the disclosure.

Referring to FIG. 6, the wireless power transmission circuit 525 of the external electronic device 520 and the wireless power reception circuit 511 of the electronic device 510 may establish the first communication channel 531 at operation 601.

According to various embodiments of the disclosure, the wireless power transmission circuit 525 may broadcast a ping signal, and the wireless power reception circuit 511 may receive the ping signal and transmit a response signal. The wireless power transmission circuit 525 may detect proximity of the electronic device 510 based on the receipt of the response signal.

According to various embodiments of the disclosure, the wireless power reception circuit 511 may transmit the first identity information through the first communication channel at operation 602. The first identity information may mean the information for distinguishing the electronic device 510 from other electronic devices. The first identity information may be data related to wireless power transmission from the wireless power transmission circuit 525 to the wireless power reception circuit 511.

According to various embodiments of the disclosure, the wireless power transmission circuit 525 may transmit configuration information to the wireless power reception circuit 511 through the first communication channel at operation 603. The configuration information may be data related to wireless power transmission from the wireless power transmission circuit 525 to the wireless power reception circuit 511 (e.g., power transmission voltage value and current value). According to various embodiments of the disclosure, the configuration information being transmitted at operation 603 may include second identity information.

According to various embodiments of the disclosure, the wireless power transmission circuit 525 may transmit power to the wireless power reception circuit 511 wirelessly at operation 605.

According to various embodiments of the disclosure, the wireless power transmission circuit 525 and the wireless power reception circuit 511 may transition from a ping detection phase for detecting proximity between the external electronic device 520 and the electronic device 510 to a configuration phase for establishing a connection between the external electronic device 520 and the electronic device 510 and to a power transfer phase for transmitting power from the external electronic device 520 to the electronic device 510 in sequence to establish the first communication channel 531, transmitting the first identity information, and transferring power.

According to various embodiments of the disclosure, the first processor 523 may transmit a signal for establishing the second communication channel 532 (e.g., inquiry about second communication channel supportability and request for activating a wireless communication circuit) to the second processor 513 through the first communication channel 531 at operation 607. The wireless power transmission circuit 525 may transmit the signal generated by the first processor 523 to the wireless power reception circuit 511 through the first communication channel 531. The wireless power reception circuit 511 may deliver the signal for establishing the second communication channel 532 to the second processor 513.

According to various embodiments of the disclosure, the second processor 513 may transmit a response message to the first processor 523 at operation 609 in response to the signal for establishing the second communication channel. The wireless power reception circuit 511 may transmit the response message generated by the second processor 513 to the wireless power transmission circuit 525 through the first communication channel 531. The wireless power transmission circuit 525 may deliver the response message to the first processor 523.

According to various embodiments of the disclosure, the first processor 523 may activate the first wireless communication circuit 521 at operation 611. The first processor 523 may generate recognition information indicative of detection of the electronic device 510 supporting the second communication scheme upon receipt of the first identity information and send the recognition information to the first wireless communication circuit 521. The first wireless communication circuit 521 may perform an operation for establishing the second communication channel 532 upon receipt of the recognition information.

According to various embodiments of the disclosure, the second processor 513 may send a signal requesting the second identity information to the wireless power reception circuit 511 at operation 613. The second identity information may be the identity information of the external electronic device 520, which is transmitted through the first communication channel 531.

According to various embodiments of the disclosure, the second processor 513 may encrypt the identity information of the electronic device 510, using various methods, and transmit the encrypted identity information to the external electronic device 520. By encrypting the identity information, it is possible to prevent another electronic device (e.g., second electronic device 403) connected to the external electronic device 520 from ascertaining the identity information of the electronic device 510, thereby strengthening security.

According to various embodiments of the disclosure, the wireless power reception circuit 511 may transmit a signal requesting the second identity information to the wireless power transmission circuit 525 through the first communication channel 531 at operation 615. The wireless power transmission circuit 525 may deliver the signal requesting the second identity information and the first identity information to the first processor 523 at operation 617.

According to various embodiments of the disclosure, the first processor 523 may generate the second identity information to the wireless power transmission circuit 525 at operation 619 upon receipt of the signal requesting the second identity information. The wireless power transmission circuit 525 may transmit the second identity information to the wireless power reception circuit 511 through the first communication channel 531 at operation 621. The wireless power reception circuit 511 may deliver the second identity information to the second processor 513 at operation 623.

According to various embodiments of the disclosure, the second processor 513 may receive the second identity information.

According to various embodiments of the disclosure, operations 613 to 623 for requesting and transmitting the second identity information may be omitted. In the case where operations 613 to 623 are omitted, the electronic device 510 and the external electronic device 520 may establish the second communication channel 532 based on the configuration information or the first identity information at operation 625.

According to various embodiments of the disclosure, the second processor 513 may control the second wireless communication circuit 515 to establish the second communication channel 451 between the second wireless communication circuit 515 and the first wireless communication circuit 521 at operation 625. The second processor 513 may activate the second communication channel 532 based on the second identity information received through the first communication channel 531. The first wireless communication circuit 521 may transmit a signal for activating the second communication channel 532 to the second wireless communication circuit 515. The second wireless communication circuit 515 may receive the signal for activating the second communication channel 532 from the first wireless communication circuit 521 and transmit data for establishing the second communication channel 532. The second processor 513 may control the second wireless communication circuit 515 to establish the second communication channel 532 with the external electronic device 520 identified by the second identity information and protect against establishing the second communication channel 532 with another external electronic device (e.g., second power transmission device 404). The external electronic device 520 may also control to establish the second communication channel 532 based on the first identity information transmitted by the electronic device 510. For example, it may be possible to control such that the external electronic device 520 establishes the second communication channel 532 with the electronic device 510 identified by the first identity information and protect against establishing the second communication channel 532 with other electronic devices (e.g., second electronic device 403). Through the above-described operation, it is possible to avoid occurrence of a cross-connection.

According to various embodiments of the disclosure, the second processor 513 may receive data including charging-related information from the external electronic device 520 through the second communication channel 532 and control power transmission of the external electronic device 520 connected through the first communication channel 531.

According to various embodiments of the disclosure, the second processor 513 may receive power reception mode switching data from the external electronic device 520 through the second communication channel 532. The power reception mode switching data may mean the data required for switching from the first power reception mode to the second power reception mode. The second power reception mode may have a wireless transmit power level higher than that of the first power reception mode. The wireless power reception circuit 511 operating in the second power reception mode may charge the battery (e.g., battery 420) faster than in the first power reception mode.

According to various embodiments of the disclosure, the second processor 513 may transmit/receive the power reception mode switching data including information indicating whether the external electronic device 520 supports the second power transmission mode and whether the external electronic device 520 is a genuine product and device information (e.g., device class and model name) of the external electronic device 520. The second processor 513 may determine whether to perform power reception mode switching based on the power reception mode switching data.

According to various embodiments of the disclosure, the second processor 513 may receive the power reception mode switching data from the external electronic device 520 through the first communication channel 531. In the case of receiving the power reception mode switching data from the external electronic device 520 through the first communication channel 531, the second processor 513 may transmit/receive the power reception mode switching data from the external electronic device 520 through the first communication channel 531 at operations 601, 603, and 605.

The second processor 513 may also receive the power reception mode switching data from the external electronic device 520 through both the first and second communication channels 531, 532.

According to various embodiments of the disclosure, the second processor 513 may perform authentication on the external electronic device 520 using data included in the power reception mode switching data for determining whether the external electronic device 520 is a genuine product. The second processor 513 may determine whether to perform the power reception mode switching based on the authentication result on the external electronic device 520. By way of example, when the external electronic device 520 passes the authentication, the second processor 513 may control the wireless power reception circuit 511 to switch from the first power reception mode to the second power reception mode. By way of another example, when the external electronic device 520 fails the authentication, the second processor 513 may control the wireless power reception circuit 511 to remain in the first power reception mode.

According to various embodiments of the disclosure, the wireless power transmission circuit 525 may transmit the configuration information or the second identity information to the wireless power reception circuit 511 through the first communication channel 531 periodically after establishing the second communication channel 532. The electronic device 510 may ascertain the connection status with the external electronic device 520 based on the configuration information being transmitted through the first communication channel 531 or the second identity information and information being transmitted through the second communication channel 532.

Figure 7:
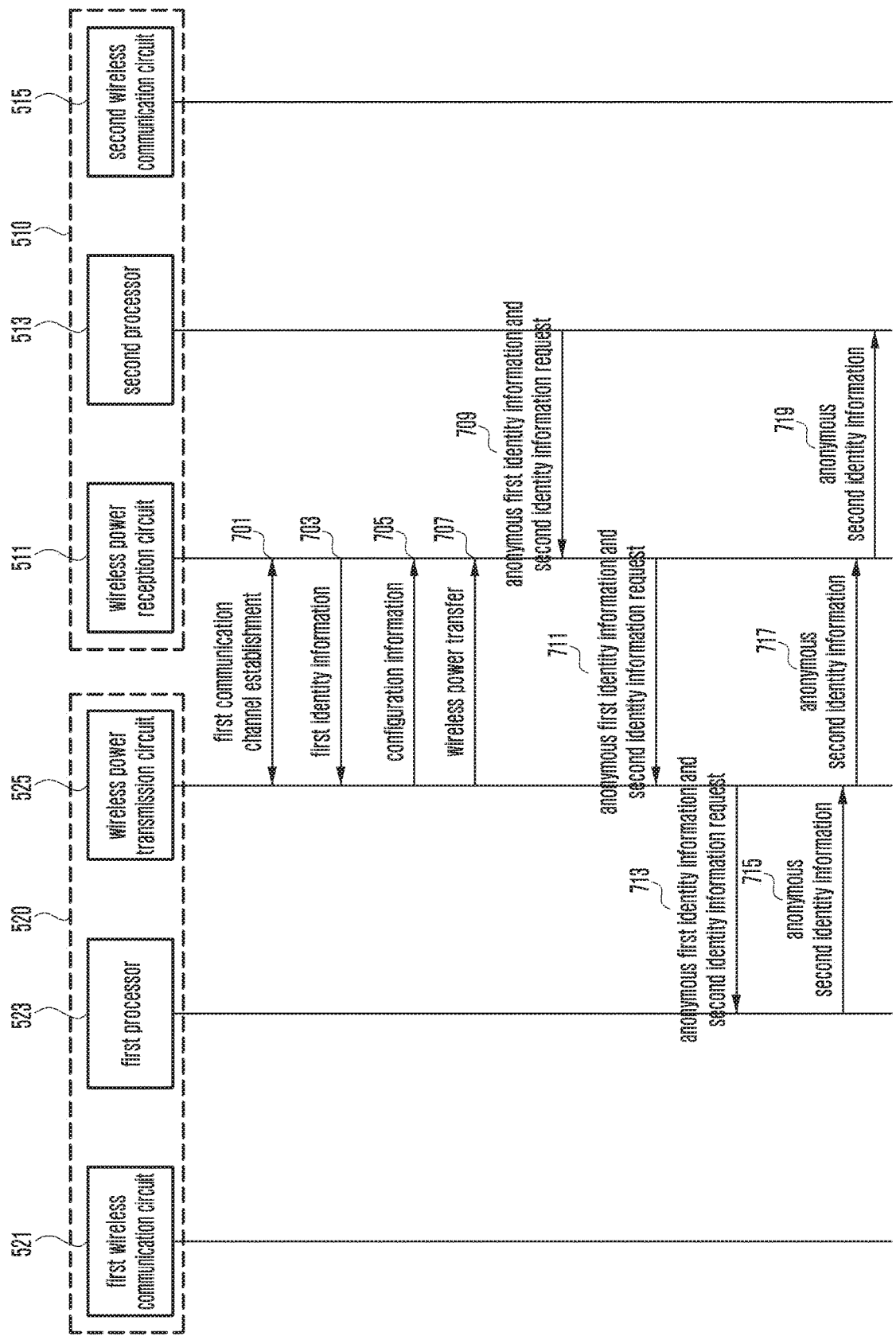
FIG. 7 is a signal flow diagram illustrating a procedure for an electronic device to establish a second communication channel using anonymous data according to various embodiments of the disclosure.

FIG. 7 is a signal flow diagram illustrating a procedure for an electronic device to establish a second communication channel using anonymous data according to various embodiments of the disclosure.

In referring to FIG. 7, the wireless power transmission circuit 525 of the external electronic device 520 and the wireless power reception circuit 511 of the electronic device 510 may establish the first communication channel at operation 701.

According to various embodiments of the disclosure, the wireless power transmission circuit 525 may broadcast a ping signal, and the wireless power reception circuit 511 may receive the ping signal and transmit a response signal. The wireless power transmission circuit 525 may detect proximity of the electronic device 510 based on the receipt of the response signal.

According to various embodiments of the disclosure, the wireless power reception circuit 511 may transmit the first identity information through the first communication channel 531 at operation 703. The first identity information may mean the information for use in identifying the external electronic device 520. The first identity information may be data related to wireless power transmission from the wireless power transmission circuit 525 to the wireless power reception circuit 511. The first identity information may be encrypted prior to transmission. The first identity information may be encrypted in the form of anonymous data.

According to various embodiments of the disclosure, the wireless power transmission circuit 525 may transmit configuration information to the wireless power reception circuit 511 through the first communication channel 531 at operation 705. The configuration information may be data related to wireless power transmission from the wireless power transmission circuit 525 to the wireless power reception circuit 511 (e.g., power transmission voltage value and current value). According to various embodiments of the disclosure, the wireless power transmission circuit 525 may transmit power to the wireless power reception circuit 511 wirelessly at operation 707.

According to various embodiments of the disclosure, the wireless power transmission circuit 525 and the wireless power reception circuit 511 may transition from a ping detection phase for detecting proximity between the external electronic device 520 and the electronic device 510 to a configuration phase for establishing a connection between the external electronic device 520 and the electronic device 510 and to a power transfer phase for transmitting power from the external electronic device 520 to the electronic device 510 in sequence. The wireless power transmission circuit 525 and the wireless power reception circuit 511 may establish the first communication channel 531 to perform the first identity information transmission and wireless power transfer.

According to various embodiments of the disclosure, the first processor 523 may transmit a signal for generating a second communication channel 532 (e.g., inquiry about second communication channel supportability or request for activating a wireless communication circuit) to the second processor 513 through the first communication channel 531. The data included in the signal for establishing the second communication channel 532 may be encrypted in various manners (e.g., anonymized data packet (anonymous packet)).

According to various embodiments of the disclosure, the wireless power transmission circuit 525 may transmit the signal generated by the first processor 523 to the wireless power reception circuit 511 through the first communication channel 531. The wireless power reception circuit 511 may deliver the signal for establishing the second communication channel 532 to the second processor 513.

According to various embodiments of the disclosure, the second processor 513 may transmit a response message to the first processor 523 in response to the signal requesting that the second communication channel 532 be established. The wireless power reception circuit 511 may transmit the response message generated by the second processor 513 to the wireless power transmission circuit 525 through the first communication channel 531. The wireless power transmission circuit 525 may deliver the response message to the first processor 523.

According to various embodiments of the disclosure, the first processor 523 may transmit a signal inquiring about supportability of another charging mode (e.g., fast charging mode) to the second processor 513.

According to various embodiments of the disclosure, the second processor 513 may generate a signal including anonymous first identity information and a request for the second identity information to the wireless power reception circuit 511 at operation 709. The first identity information may mean the identity information of the electronic device 510 that is transmitted through the first communication channel 531. The second identity information may mean the identity information of the external electronic device 520 that is transmitted through the first communication channel 531. The first identity information may be encrypted using an encryption method pre-agreed upon between the electronic device 510 and the external electronic device 520. The first identity information may be generated in the form of an anonymous data packet. Operations 709, 711, and 713 for requesting for the second identity information may be omitted.

According to an embodiment, the second processor 513 may encrypt the identity information of the electronic device 510, using various methods, and transmit the encrypted identity information to the external electronic device 520. By encrypting the identity information, it is possible to prevent another electronic device (e.g., second electronic device 403) connected to the external electronic device 520 from ascertaining the identity information of the electronic device 510, thereby strengthening security.

According to various embodiments of the disclosure, the wireless power reception circuit 511 may transmit the signal including the anonymous first identity information and the request for the second identity information to the wireless power transmission circuit 525 through the first communication channel 531 at operation 711. The wireless power transmission circuit 525 may deliver the signal including the anonymous first identity information and the request for the second identity information to the first processor 523 at operation 713.

According to various embodiments of the disclosure, in the case of transmitting the anonymous first identity information at operations 709 to 713, the operations of operations 703 and 705 may be replaced by other operations (e.g., wireless power transfer and various data transmission/reception operations through the first communication channel).

According to various embodiments of the disclosure, the first processor 523 may send the second identity information, at operation 715, to the wireless power transmission circuit 525 upon receipt of the signal including the anonymous first identity information and the request for the second identity information. The second identity information may be encrypted according to an encryption method pre-agreed between the electronic device 510 and the external electronic device 520. The second identity information may be generated in the form of an anonymous data packet. The first processor 523 may encrypt the second identity information using the predetermined encryption method and transmit the anonymous second identity information to the wireless power transmission circuit 525.

The wireless power transmission circuit 525 may transmit the anonymous second identity information to the wireless power reception circuit 511 through the first communication channel 531 at operation 717. The wireless power reception circuit 511 may deliver the anonymous second identity information to the second processor 513 at operation 719.

According to various embodiments of the disclosure, the second processor 513 may receive the anonymous second identity information. The second identity information may include the identity information of the external electronic device 520 that is received through the first communication channel 531 and information for establishing the second communication channel 532.

According to various embodiments of the disclosure, the second processor 513 may receive the anonymous second identity information and perform an operation of establishing the second communication channel 532 based on the anonymous second identity information or a charging mode switching operation.

According to various embodiments of the disclosure, the second processor 513 may control the second wireless communication circuit 515 to establish a connection with the first wireless communication circuit 521 through the second communication channel 532. The second processor 513 may activate the second communication channel 532 based on the second identity information received through the first communication channel 531. The second processor 513 may control the second wireless communication circuit 515 to establish the second communication channel 532 with the external electronic device 520 identified by the second identity information and protect against establishing the second communication channel 532 with another external electronic device (e.g., second power transmission device 404). The external electronic device 520 may also control to establish the second communication channel 532 based on the first identity information transmitted by the electronic device 510. For example, it may be possible to control such that the external electronic device 520 establishes the second communication channel 532 with the electronic device 510 identified by the first identity information and protect against establishing the second communication channel 532 with another electronic device (e.g., second electronic device 403 of FIG. 4A). Through the above-described operation, it is possible to avoid occurrence of a cross-connection.

According to various embodiments of the disclosure, the second processor 513 may exchange anonymous identity information with the first processor 523 and receive power from the external electronic device 520 wirelessly in the switched charging mode. The second processor 513 may control to receive power in the charging mode determined based on the second identity information to charge the battery.

Figure 8:
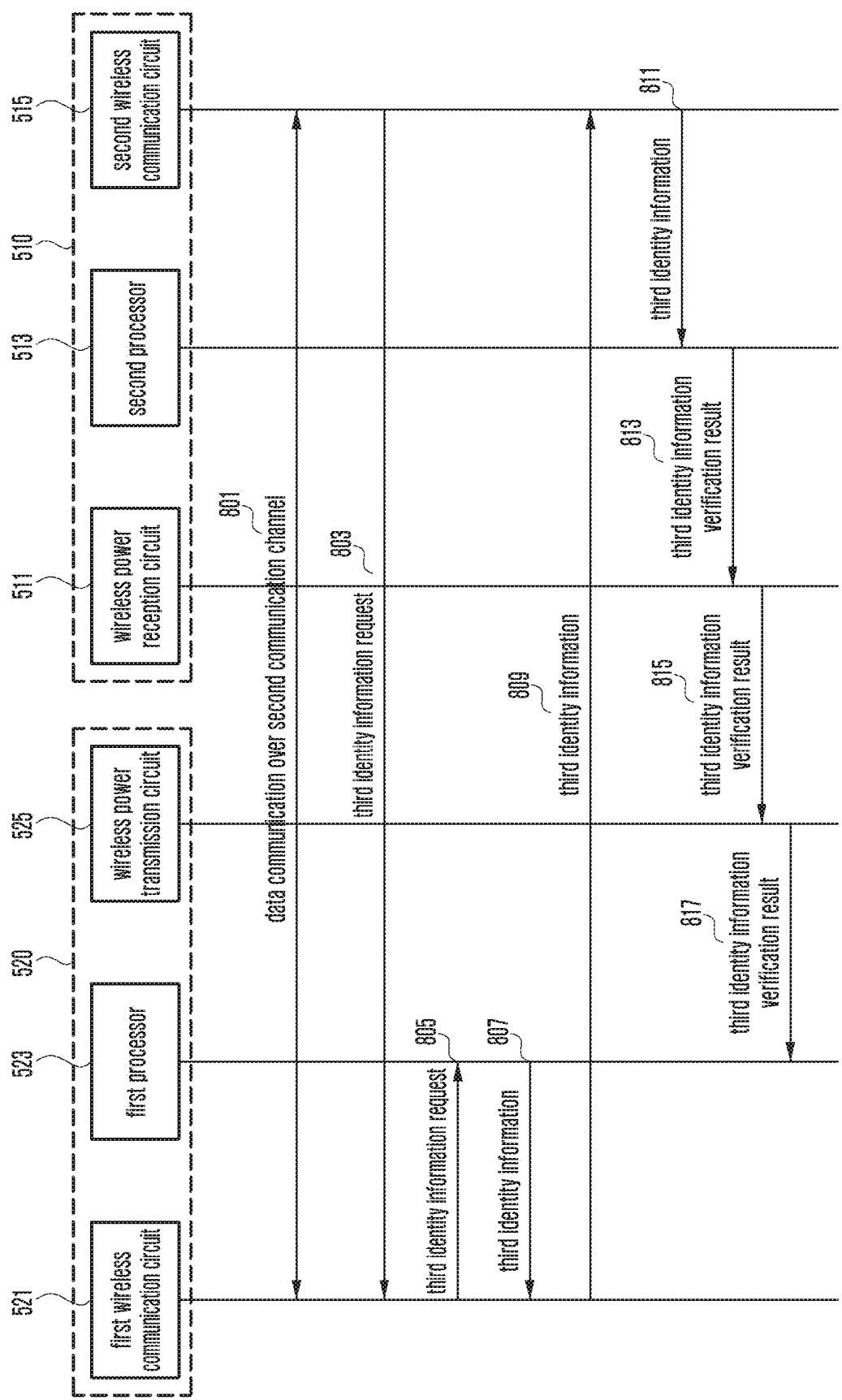
FIG. 8 is a signal flow diagram illustrating a procedure for an electronic device connected to an external electronic device through a second communication channel to determine whether to maintain the second communication channel according to various embodiments of the disclosure.

FIG. 8 is a signal flow diagram illustrating a procedure for an electronic device connected to an external electronic device through a second communication channel to determine whether to maintain the second communication channel according to various embodiment of the disclosure.

The operation embodied in FIG. 8 may be applicable to the situation where the electronic device 510 and the external electronic device 520 are connected to each other through both the first and second communication channels 531, 532.

According to various embodiments of the disclosure, the first wireless communication circuit 521 and the second wireless communication circuit 515 may communicate data through the second communication channel 532 at operation 801.

According to various embodiments of the disclosure, the second wireless communication circuit 515 may transmit, at operation 803, a signal requesting for third identity information to the first wireless communication circuit 521 through the second communication channel 532 under the control of the second processor 513.

According to various embodiments of the disclosure, the second processor 513 may request for and ascertain the third identity information of the external electronic device 520 continuously through the second communication channel 532 to protect against a cross-connection while being connected with the external electronic device 520 through the first and second communication channels 531, 532. For example, the second processor 513 may request to the external electronic device 520 for the third identity information at a predetermined interval.

According to various embodiments of the disclosure, the first wireless communication circuit 521 may request to the first processor 523 for the third identity information at operation 805. The operation of requesting for the third identity information at operation 803 may mean delivering the third identity information request received from the second wireless communication circuit 515 to the first processor 523.

According to various embodiments of the disclosure, the first processor 523 may send the third identity information to the first wireless communication circuit 521 at operation 807. The first processor 523 may send the third identity information to the first wireless communication circuit 521 in response to the third identity information request received at operation 805.

According to various embodiments of the disclosure, the first wireless communication circuit 521 may transmit the third identity information or information related to the third identity information to the second wireless communication circuit 515 through the second communication channel 532 at operation 809.

According to various embodiments of the disclosure, although not depicted, the wireless power transmission circuit 525 may transmit the third identity information to the wireless power reception circuit 511 through the first communication channel 531.

According to various embodiments of the disclosure, the second wireless communication circuit 515 may deliver, at operation 811, the third identity information received through the second communication channel 532 to the second processor 513.

According to various embodiments of the disclosure, the second processor 513 may determine whether the third identity information is received from the external electronic device 520 based on at least the second identity information. The second processor 513 may compare the second identity information with the third identity information to determine whether the second identity information and the third identity information are associated with the same device. When the second identity information and the third identity information match, the second processor 513 may verify that the third identity information is received from the external electronic device 520.

According to various embodiments of the disclosure, when it is verified that the third identity information is received from the external electronic device 520, the second processor 513 may maintain the connections through the first and second communication channels 531, 532. The second processor 513 may continue receiving power wirelessly from the external electronic device 520.

According to various embodiments of the disclosure, the second processor 513 may send the third identity information verification result to the wireless power reception circuit 511 at operation 813. The wireless power reception circuit may transmit the third identity information verification information to the wireless power transmission circuit 525 at operation 815. The wireless power transmission circuit 525 may deliver the third identity information verification result to the first processor 523 at operation 817.

According to various embodiments of the disclosure, the third identity information verification result may include information indicating whether the third identity information corresponds to the identity information transmitted by the external electronic device 520 that has transmitted the second identity information. The third identity information verification result may include at least one of a signal indicating that the third identity information is received from the external electronic device 520 (e.g., id_correct packet) and a signal indicating that the third identity information is received from an electronic device other than the external electronic device 520 (e.g., id_incorrect packet).

In the embodiment of FIG. 8, the description is made under the assumption that the third identity information is the identity information transmitted by the external electronic device 520 that has transmitted the second identity information and, in the case where the third identity information is the identity information transmitted by the external electronic device 520 that has transmitted the second identity information, the signal transmitted at operations 813, 815, and 817 may be a signal indicating that the third identity information is received from the external electronic device 520 (e.g., id_correct).

According to various embodiments of the disclosure, the first processor 523 may determine whether to release the second communication channel 532 and control the first wireless communication circuit 521 based on the third identity information verification result. When it is determined that the third identity information corresponds to the identity information transmitted by the external electronic device 520 that has transmitted the second identity information, it may be possible to maintain the first and second communication channels 531, 532.

According to various embodiments of the disclosure, when it is determined that the third identity information is not the identity information transmitted by the external electronic device 520 that has transmitted the second identity information or that the second identity information is not the identity information transmitted by the external electronic device 520 that has transmitted the third identity information, the signal transmitted at operations 813, 815, and 817 may be a signal indicating that the second identity information is the identity information received from an electronic device other than the external electronic device 520.

In this case the second communication channel 532 may be released, and a description thereof is made hereinafter with reference to FIGS. 9 and 10.

According to various embodiments of the disclosure, the signal transmitted at operations 813, 815, and 817 may be a signal conveying the third identity information received by the electronic device 510 or the information generated based on the third identity information to the external electronic device 520. The external electronic device 520 may compare the received signal with the third identity information. The external electronic device 520 may determine whether to maintain the second communication channel 532 based on the comparison result.

Figure 9:
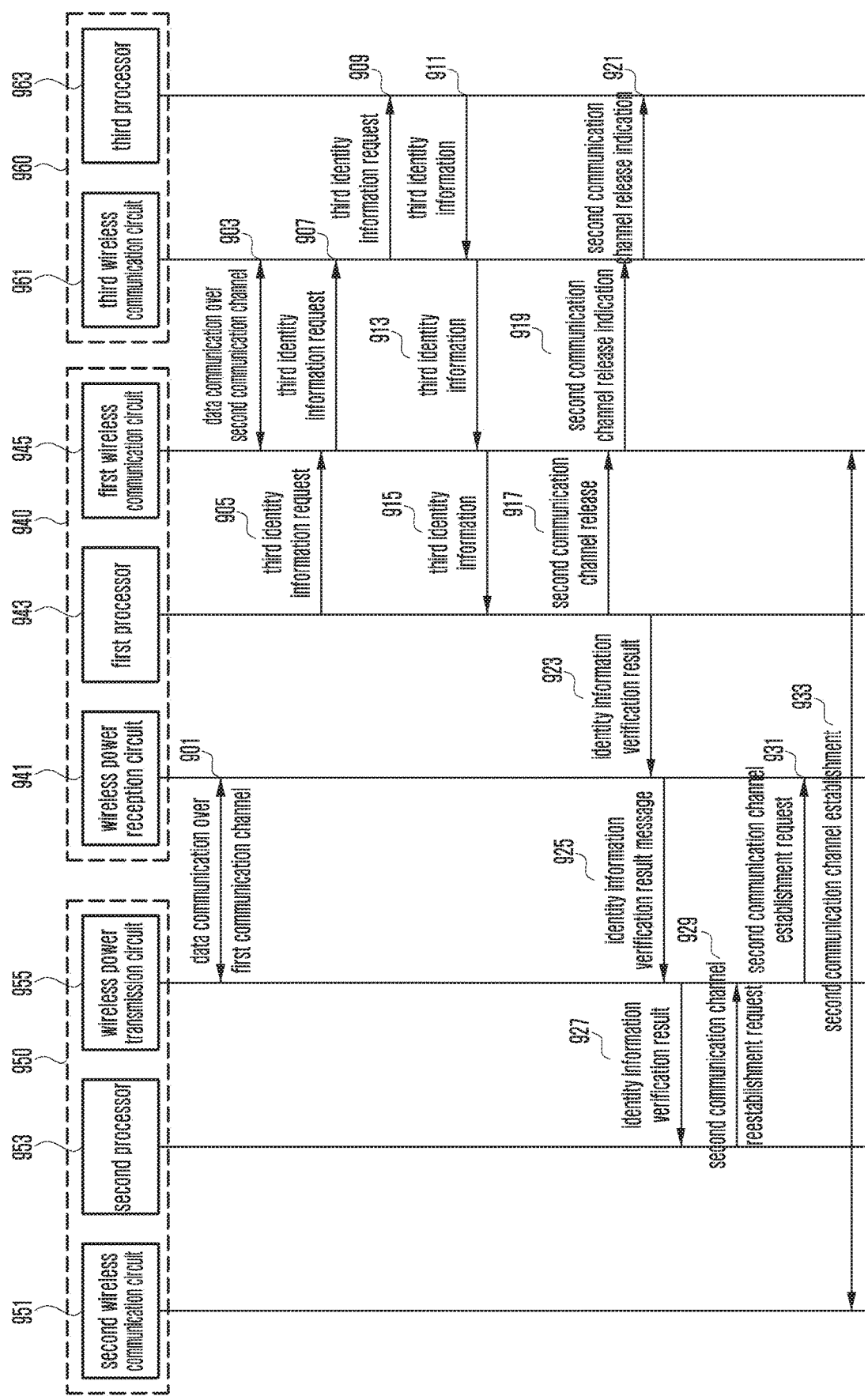
FIG. 9 is a signal flow diagram illustrating a procedure for an electronic device to release a second communication channel according to various embodiments of the disclosure.

FIG. 9 is a signal flow diagram illustrating a procedure for an electronic device to release a second communication channel according to various embodiments of the disclosure.

In the embodiment of FIG. 9, a first electronic device 940 (e.g., first electronic device 401) may include a first processor 943 and the first processor 943 ascertains that third identity information is received from a third electronic device 960 (e.g., second power transmission device 404) and second identity information is received from a second electronic device 950 (e.g., first power transmission device 402) and then releases a second communication channel (e.g., second communication channel 451).

Referring to FIG. 9, the first electronic device 940 may connect to the second electronic device 950 through a first communication channel (e.g., first communication channel 441) and a third electronic device 960 through the second communication channel. For example, the first electronic device 940 may switch the wireless power transmission source from the second electronic device 950 to the third electronic device 960. The first electronic device 940 may connect to the second electronic device 950 through the first communication channel and the third electronic device 960 through the second communication channel. This situation may cause a cross-connection, which brings about a problem in controlling power reception from the second electronic device 950.

According to various embodiments of the disclosure, the wireless power transmission circuit 955 of the second electronic device 950 and the wireless power reception circuit 941 of the first electronic device 940 may communicate data through the first communication channel.

According to various embodiments of the disclosure, the first electronic device 940 may receive the second identity information corresponding to the second electronic device 950 through the first communication channel at operation 901.

According to various embodiments of the disclosure, the first wireless communication circuit 945 of the first electronic device 940 and the third wireless communication circuit 961 of the third electronic device 960 may communicate data through the second communication channel at operation 903.

According to various embodiments of the disclosure, the first processor 943 may control the first wireless communication circuit 945, at operation 905, to transmit a signal requesting the third identity information to the third electronic device 960.

According to various embodiments of the disclosure, the first wireless communication circuit 945 may transmit the signal requesting the third identity information to the third wireless communication circuit 961 through the second communication channel under the control of the first processor 943 at operation 907.

According to various embodiments of the disclosure, the third wireless communication circuit 961 may deliver the signal requesting the third identity information to the third processor 963 at operation 909. The third processor 963 may control the third wireless communication circuit 961 to transmit the third identity information at operation 911 in response to receiving the signal requesting for the third identity information.

According to various embodiments of the disclosure, the third wireless communication circuit 961 may transmit the third identity information to the first wireless communication circuit 945 through the second communication channel at operation 913.

According to various embodiments of the disclosure, the first wireless communication circuit 945 may deliver the third identity information to the first processor 943 at operation 915.

According to various embodiments of the disclosure, the first processor 943 may determine whether the third identity information is transmitted by the second electronic device 950 that has transmitted the second identity information.

According to various embodiments of the disclosure, the first processor 943 may determine whether the third identity information is received from the second electronic device 950 based on at least the second identity information. The first processor 943 may compare the second identity information and the third identity information to determine whether the second identity information and the third identity information match. When it is determined that the second identity information and the third identity information do not match, the first processor 943 may determine that the third identity information is received from an electronic device other than the second electronic device 950 (e.g., third electronic device 960).

According to various embodiments of the disclosure, when it is determined that the third identity information is received from an electronic device other than the second electronic device 950, the first processor 943 may continue receiving power from the second electronic device 950 wirelessly. The first processor 943 may maintain the connection with the second electronic device 950 through the first communication channel.

According to various embodiments of the disclosure, when it is determined that the third identity information is not transmitted by the second electronic device 950 that has transmitted the second identity information, the first processor 943 may control the first wireless communication circuit 945 to release the second communication channel at operation 917.

According to various embodiments of the disclosure, the first wireless communication circuit 945 may transmit a message indicative of the release of the second communication channel to the third wireless communication circuit 961 through the second communication channel at operation 919 and release the second communication channel under the control of the first processor 943.

According to various embodiments of the disclosure, the third wireless communication circuit 961 may deliver the message indicative of the release of the second communication channel to the third processor 963 at operation 921.

According to various embodiments of the disclosure, the first processor 943 may control the wireless power reception circuit 941 to transmit a second or third identity information verification result or data generated based on the verification result to the second electronic device 950 at operation 923.

According to various embodiments of the disclosure, the wireless power reception circuit 941 may transmit the third identity information verification result to the wireless power transmission circuit 955 of the second electronic device 950 through the first communication channel at operation 925 under the control of the first processor 943.

According to various embodiments of the disclosure, the third identity information verification result may include information indicating whether the third identity information is the identity information transmitted by the second electronic device 950 that has transmitted the second identity information.

According to various embodiments of the disclosure, the wireless power transmission circuit 955 may deliver the third identity information verification result to the second processor 953 at operation 927.

According to various embodiments of the disclosure, when it is determined that the third identity information is not the identity information transmitted by the second electronic device 950 that has transmitted the first identity information, the signal transmitted at operations 923, 925, and 927 may be a signal indicating that the identity information is received from an electronic device other than the second electronic device 950 (e.g., id_incorrect packet).

According to various embodiments of the disclosure, when it is determined that the third identity information is not the identity information transmitted by the second electronic device 950 that has transmitted the first identity information, the second processor 953 may control the wireless power transmission circuit 955 to transmit, at operation 929, a signal requesting for reestablishing the second communication channel to the first electronic device 940.

According to various embodiments of the disclosure, the wireless power transmission circuit 955 of the second electronic device 950 may transmit a signal request for establishing the second communication channel to the wireless power reception circuit 941 of the first electronic device 940 through the first communication channel at operation 931. The second communication channel may be established as described with reference to operations 609 to 623 of FIG. 6.

According to various embodiments of the disclosure, the first wireless communication circuit 945 and the second wireless communication circuit 951 may establish the second communication channel at operation 933. The first wireless communication circuit 945 and the second wireless communication circuit 951 may establish the second communication channel based on the first or second identity information.

In the embodiment of FIG. 9, the first communication channel and the wireless power transfer are maintained while the second communication channel is released. A description is made of a situation where both the first and second communication channels are released and the wireless power transfer is terminated with reference to FIG. 10.

Figure 10:
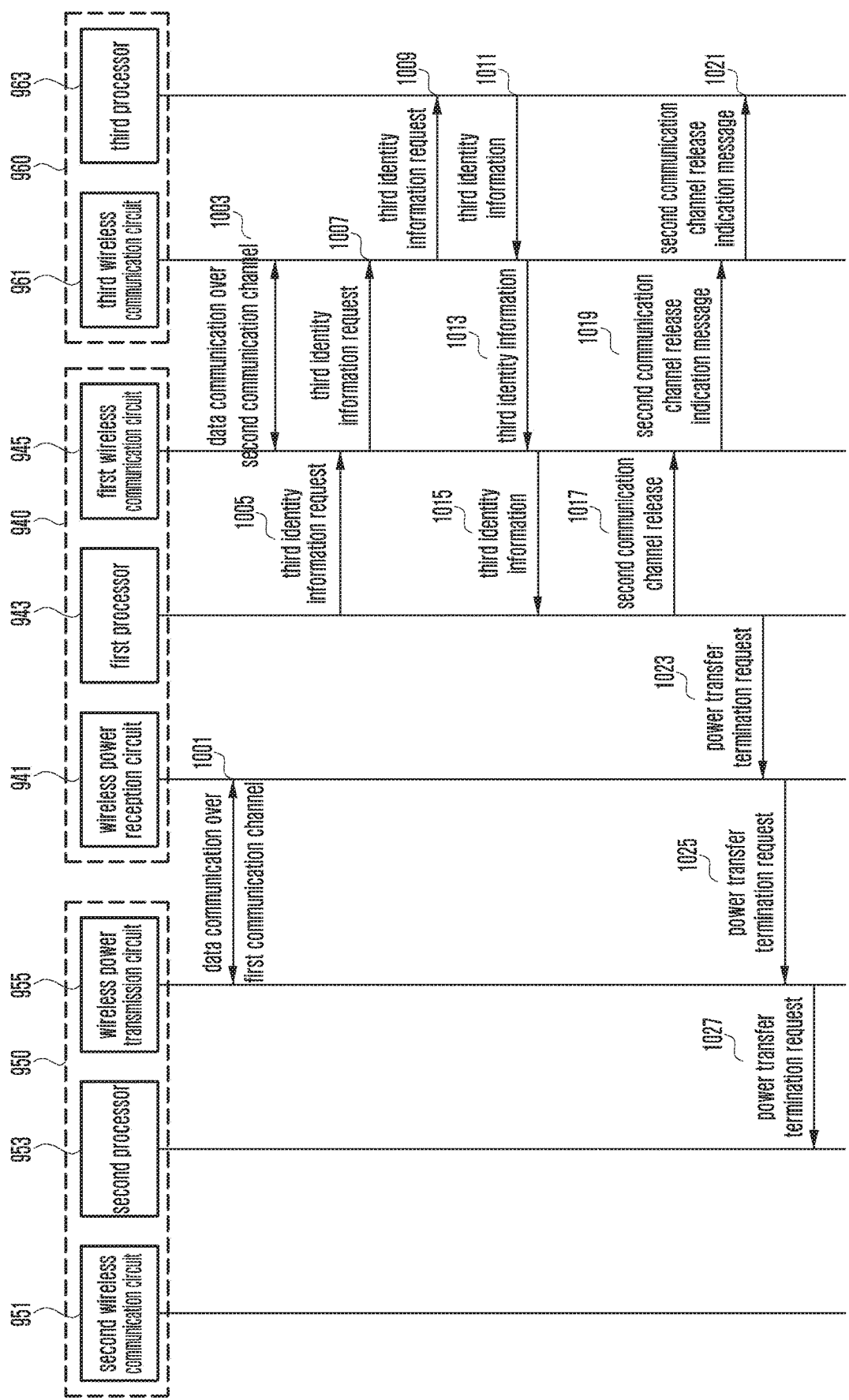
FIG. 10 is a signal flow diagram illustrating a procedure for an electronic device to release a second communication channel according to various embodiments of the disclosure.

FIG. 10 is a signal flow diagram illustrating a procedure for an electronic device to release a second communication channel according to various embodiments of the disclosure.

In the embodiment of FIG. 10, a first processor 943 of a first electronic device 940 (e.g., first electronic device 401) ascertains that the third identity information is received from an electronic device other than a second electronic device 950 (e.g., first power transmission device 402) that has transmitted the second identity information and, as a consequence, releases the second communication channel and terminates wireless charging.

Referring to FIG. 10, the first electronic device 940 is connected to the second electronic device 950 through the first communication channel and the third electronic device 960 through the second communication channel. This situation may cause a cross-connection, which brings about a problem in controlling power reception from the second electronic device 950.

According to various embodiments of the disclosure, the wireless power transmission circuit 955 of the second electronic device 950 and the wireless power reception circuit 941 of the first electronic device 940 may communicate data through the first communication channel at operation 1001. The wireless power reception circuit 941 may transmit first identity information to the wireless power transmission circuit 955 through the first communication channel. The wireless power transmission circuit 955 may transmit second identity information to the wireless power reception circuit 941 through the first communication channel.

According to various embodiments of the disclosure, the first wireless communication circuit 945 of the first electronic device 940 and the third wireless communication circuit 961 of the third electronic device 960 may communicate data through the second communication channel at operation 1003.

According to various embodiments of the disclosure, the first processor 943 may control the first wireless communication circuit 945, at operation 1005, to transmit a signal requesting the third identity information to the third electronic device 960.

According to various embodiments of the disclosure, the first wireless communication circuit 945 may transmit, at operation 1007, the signal requesting the third identity information to the third wireless communication circuit 961 through the second communication channel under the control of the first processor 943.

According to various embodiments of the disclosure, the third wireless communication circuit 961 may deliver the signal requesting the third identity information to the third processor 963 at operation 1009. The third processor 963 may control the third wireless communication circuit 961 to transmit the third identity information at operation 1011 in response to receiving the signal requesting for the third identity information.

According to various embodiments of the disclosure, the third wireless communication circuit 961 may transmit the third identity information to the first wireless communication circuit 945 through the second communication channel at operation 1013.

According to various embodiments of the disclosure, the first wireless communication circuit 945 may deliver the third identity information to the first processor 943 at operation 1015.

According to various embodiments of the disclosure, the first processor 943 may determine whether the third identity information is transmitted by the second electronic device 950 that has transmitted the second identity information.

According to various embodiments of the disclosure, the first processor 943 may determine whether the third identity information is received from the second electronic device 950 based on at least the second identity information. The first processor 943 may compare the second identity information and the third identity information to determine whether the second identity information and the third identity information match. When it is determined that the second identity information and the third identity information do not match, the first processor 943 may determine that the third identity information is received from an electronic device other than the second electronic device 950 (e.g., third electronic device 960).

According to various embodiments of the disclosure, when it is determined that the third identity information is received from an electronic device other than the second electronic device 950, the first processor 943 may continue to control such that the first electronic device 940 receives power from the second electronic device 950 wirelessly. The first processor 943 may maintain the connection with the second electronic device 950 through the first communication channel.

According to various embodiments of the disclosure, when it is determined that the third identity information is not transmitted by the second electronic device 950 that has transmitted the second identity information, the first processor 943 may control the first wireless communication circuit 945 to release the second communication channel at operation 1017.

According to various embodiments of the disclosure, the first wireless communication circuit 945 may transmit a message indicative of the release of the second communication channel to the third wireless communication circuit 961 through the second communication channel at operation 1019 and release the second communication channel under the control of the first processor 943.

According to various embodiments of the disclosure, the third wireless communication circuit 961 may deliver the message indicative of the release of the second communication channel to the third processor 963 at operation 1021.

According to various embodiments of the disclosure, the first processor 943 may control the wireless power reception circuit 941 to transmit a signal requesting for terminating the power transfer to the second electronic device 950 at operation 1023.

According to various embodiments of the disclosure, the wireless power reception circuit 941 may transmit the signal requesting that the power transfer be terminated to the wireless power transmission circuit 955 through the first communication channel at operation 1025.

According to various embodiments of the disclosure, the wireless power transmission circuit 955 may deliver the signal requesting that the power transfer be terminated to the second processor 953 at operation 1027. Upon receipt of the signal requesting for terminating the power transfer, the second processor 953 may control the wireless power transmission circuit 955 to stop the power transfer. The wireless power transmission circuit 955 may terminate the power transfer under the control of the second processor 953. As the wireless power transfer is terminated, the first communication channel established using part of the power transfer frequency band may be released.

Figure 11:
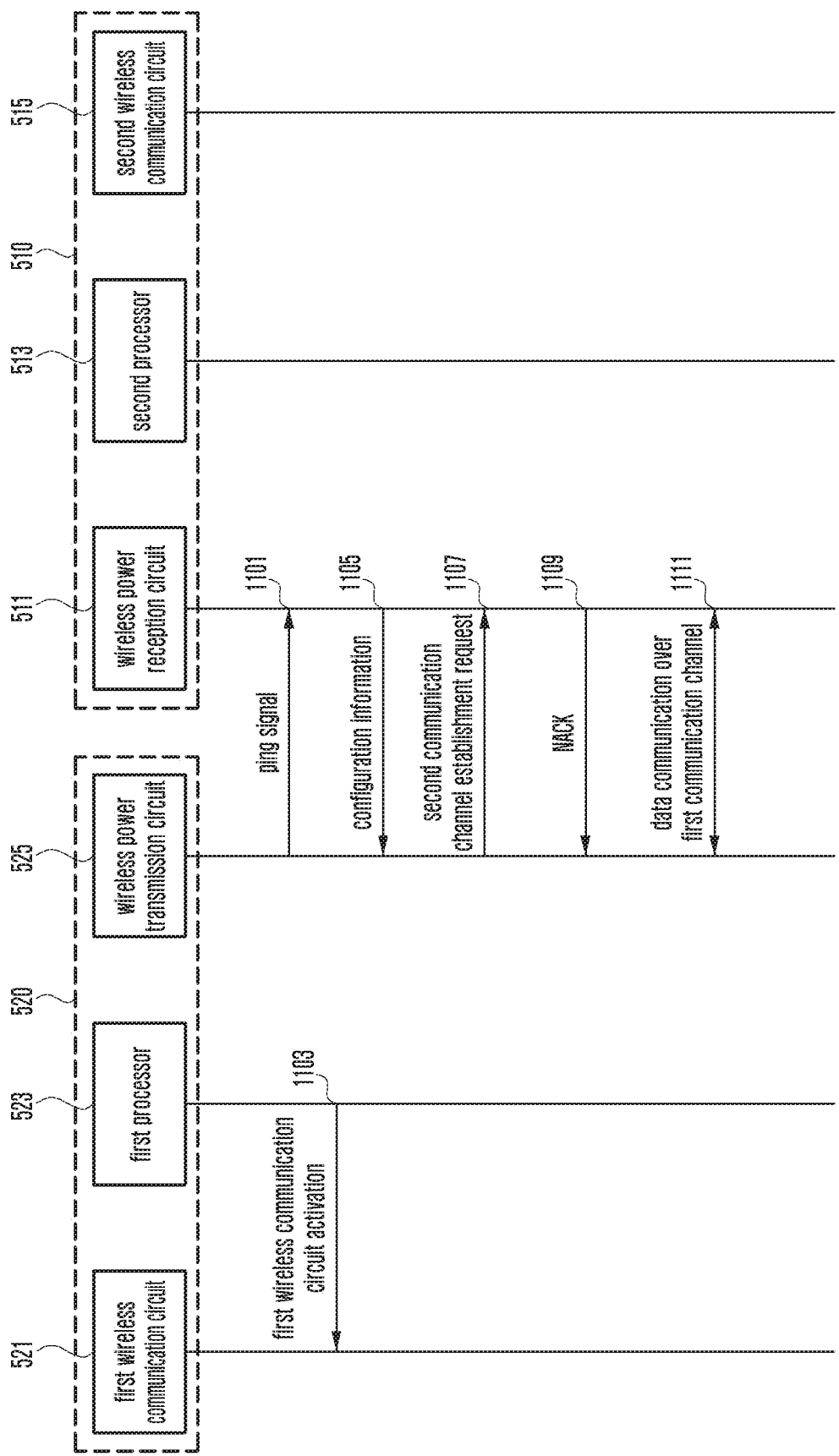
FIG. 11 is a signal flow diagram illustrating a procedure for an electronic device that does not support a second communication channel to establish a connection through a first communication channel according to various embodiments of the disclosure.

FIG. 11 is a signal flow diagram illustrating a procedure for an electronic device that does not support a second communication channel to establish a connection through a first communication channel according to various embodiments of the disclosure.

In the embodiment of FIG. 11, it is assumed that the external electronic device 520 supports the communication scheme used for the second communication channel, but the electronic device 510 does not support the communication scheme used for the second communication channel.

Referring to FIG. 11, the wireless power transmission circuit 525 may transmit a ping signal to the wireless power reception circuit 511 at operation 1101.

According to various embodiments of the disclosure, the power transfer mode may include a ping detection phase for detecting proximity between the external electronic device 520 and the electronic device 510, a configuration phase for establishing a connection between the external electronic device 520 and the electronic device 510, and a power transfer phase for transmitting power from the external electronic device 520 from the electronic device 510. The operation of operation 1101 may be an operation being performed in the ping detection phase for detecting the proximity between the external electronic device 520 and the electronic device 510. The first processor 523 may transmit a first wireless communication circuit activation message to the first wireless communication circuit at 1103.

According to various embodiments of the disclosure, the wireless power reception circuit 511 may transmit configuration information to the wireless power transmission circuit 525 at operation 1105. The configuration information may be the information required for transmitting/receiving power wirelessly. The operation of operation 1105 may be an operation being performed in the configuration phase for establishing a connection between the external electronic device 520 and the electronic device 510 for wireless power transfer.

The electronic device 510 may communicate data with the external electronic device 520 through the first communication channel established using part of the wireless power transfer frequency band.

According to various embodiments of the disclosure, the wireless power transmission circuit 525 may transmit a signal requesting that a second communication channel be established to the wireless power reception circuit 511 at operation 1107 through the first communication channel. According to various embodiments of the disclosure, the wireless power transmission circuit 525 may transmit a signal requesting for data indicating whether the electronic device 510 supports the second communication channel.

According to various embodiments of the disclosure, the electronic device 510 may not support the communication scheme used for the second communication channel. In this case, the second processor 513 of the electronic device 510 may control the wireless power reception circuit 511 to transmit a signal indicating that the electronic device 510 cannot establish the second communication channel (e.g., NACK signal) in response to the signal requesting for establishing the second communication channel. It may also be possible for the electronic device 510 to not transmit any signal indicating that the electronic device 510 can establish the second communication channel (e.g., ACK signal).

According to various embodiments of the disclosure, the wireless power reception circuit 511 may transmit the signal indicating that the electronic device 510 cannot establish the second communication channel (e.g., NACK signal) to the wireless power transmission circuit 525 at operation 1109 through the first communication channel under the control of the second processor 513. The wireless power reception circuit 511 may not respond to the signal transmitted at operation 1107.

According to various embodiments of the disclosure, the first processor 523 of the external electronic device 520 may control the wireless power transmission circuit 525 to transmit/receive data with the wireless power reception circuit 511 through the first communication channel at operation 1111 upon receipt of the signal indicating that the electronic device 510 cannot establish the second communication channel (e.g., NACK signal). The second processor 513 of the electronic device 510 may control the wireless power reception circuit 511 to transmit/receive data through the first communication channel. When no response message is received in a predetermined time period after transmitting the signal requesting that a second communication channel be established at operation 1107, the first processor 523 of the external electronic device 520 may control the wireless power transmission circuit 525 to transmit/receive data through the first communication channel.

Figure 12:
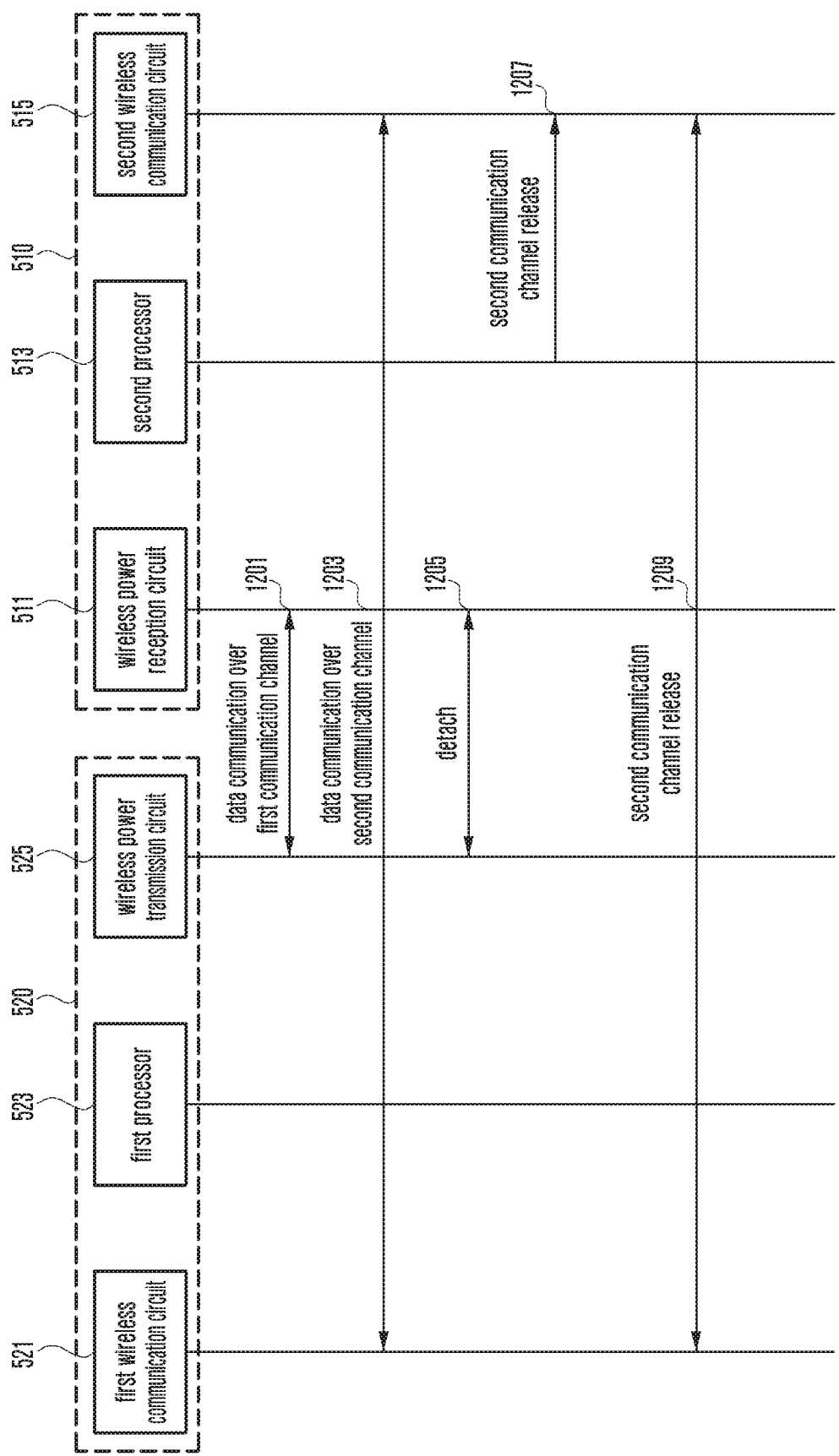
FIG. 12 is a signal flow diagram illustrating a procedure for an electronic device to release a second communication channel upon detection of a change in power reception status according to various embodiments of the disclosure.

FIG. 12 is a signal flow diagram illustrating a procedure for an electronic device to release a second communication channel upon detection of change of power reception status according to various embodiments of the disclosure.

Referring to FIG. 12, the wireless power transmission circuit 525 and the wireless power reception circuit 511 may communicate data over a first communication channel at operation 1201.

According to various embodiments of the disclosure, the first wireless communication circuit 521 and the second wireless communication circuit 515 may communicate data over a second communication channel at operation 1203.

According to various embodiments of the disclosure, the electronic device 510 may receive power reception mode switching data from the external electronic device 520 through the first or second communication channel at operation 1201 or 1203.

According to various embodiments of the disclosure, the second processor 513 may perform authentication on the external electronic device 520 based on the data for verifying whether the external electronic device 520 is a genuine product, the data being included in the power reception mode switching data. The second processor 513 may determine whether to perform power reception mode switching based on the authentication result on the external electronic device 520. By way of example, when the external electronic device 520 passes the authentication, the second processor 513 may control the wireless power reception circuit 511 to perform power reception mode switching from the first power reception mode to the second power reception mode. By way of another example, when the external electronic device 520 fails the authentication, the second processor 513 may control the wireless power reception circuit 511 to remain in the first power reception mode.

According to various embodiments of the disclosure, the wireless power transmission circuit 525 and the wireless power reception circuit 511 may detect a detach of the electronic device 510 and the external electronic device 520 from each other at operation 1205.

According to various embodiments of the disclosure, the detach of the electronic device 510 and the external electronic device 520 from each other may mean that the electronic device 510 and the external electronic device 520 have become too far apart from each other to perform wireless power transfer.

According to various embodiments of the disclosure, the wireless power transmission circuit 525 and the wireless power reception circuit 511 may detect the detach of the electronic device 510 and the external electronic device 520 from each other by ascertaining that predetermined data (e.g., CEP) are not received through the first communication channel over a predetermined time period during a charging session.

According to various embodiments of the disclosure, the detach of the electronic device 510 and the external electronic device 520 from each other may cause a phase transition to the ping detection phase for detecting proximity between the external electronic device 520 and the electronic device 510.

According to various embodiments of the disclosure, the wireless power transmission circuit 525 may transmit a ping signal upon detection of the detach of the electronic device 510 and the external electronic device 520 from each other. The external electronic device 520 may perform phase transition to the ping detection phase for detecting proximity between the external electronic device 520 and the electronic device 510 in which it transmits a ping signal to detect the proximity of the electronic device 510.

According to various embodiments of the disclosure, the second processor 513 may control the second wireless communication circuit 515 to release the second communication channel at operation 1207 upon detection of the power transfer phase transition.

According to various embodiments of the disclosure, the second processor 513 may control the second wireless communication circuit 515 to release the second communication channel upon detection of the transition from the power transfer phase to the ping detection phase.

According to various embodiments of the disclosure, the first wireless communication circuit 521 and the second wireless communication circuit 515 may release the second communication channel at operation 1209.

Through the above-described operation, it is possible to protect against occurrence of a cross-connection in a situation where the distance between the electronic device 510 and the external electronic device 520 becomes too far to perform wireless power transfer and the external electronic device 520 is transferring power wirelessly to another electronic device (e.g., second electronic device 403).

Figure 13:
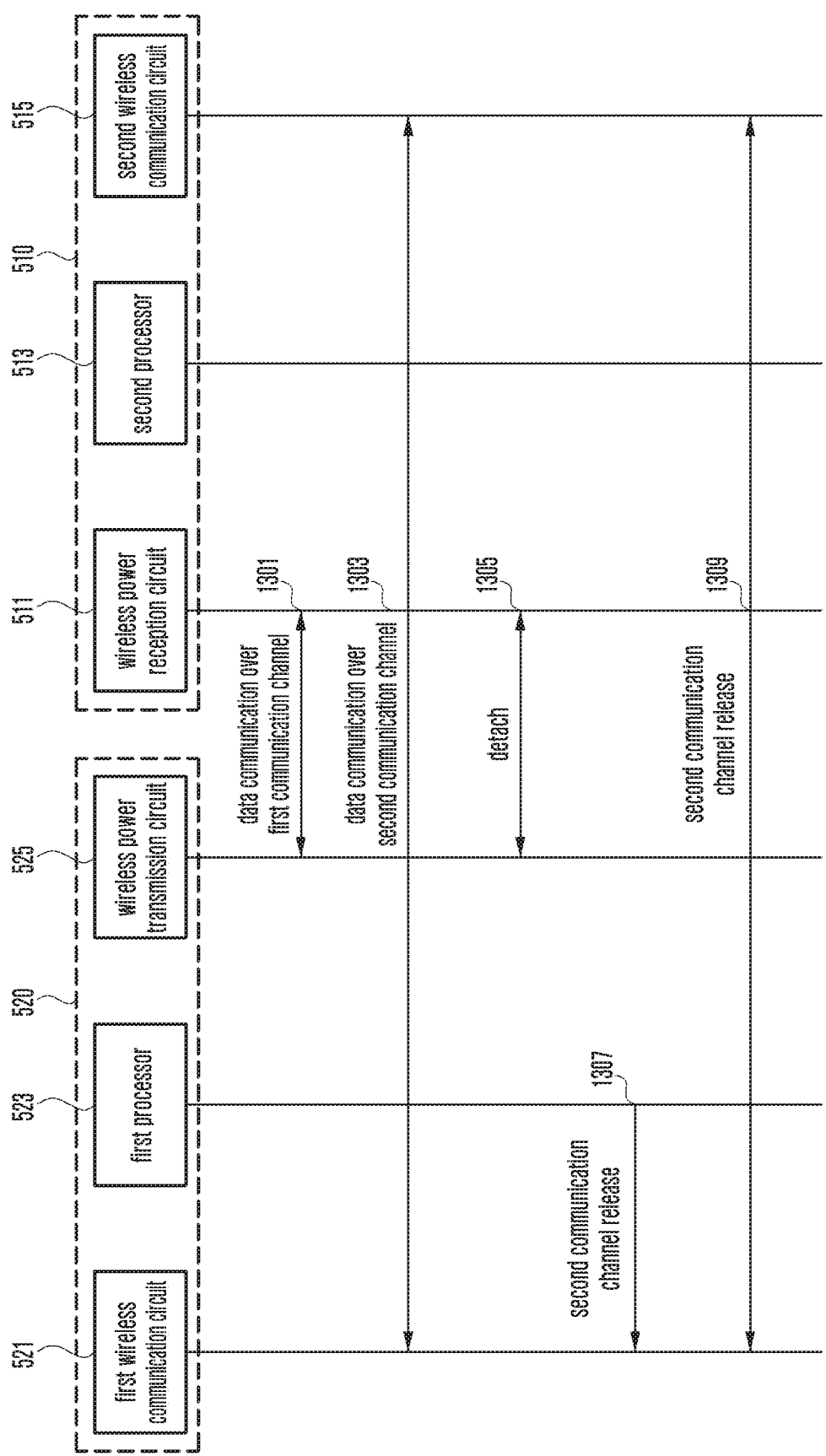
FIG. 13 is a signal flow diagram illustrating an alternative procedure for an electronic device to release a second communication channel upon detection of a change in power reception status according to various embodiments of the disclosure.

FIG. 13 is a signal flow diagram illustrating an alternative procedure for an electronic device to release a second communication channel upon detection of change of power reception status according to various embodiments of the disclosure.

Referring to FIG. 13, the wireless power transmission circuit 525 and the wireless power reception circuit 511 may communicate data through a first communication channel at operation 1301.

According to various embodiments of the disclosure, the first wireless communication circuit 521 and the second wireless communication circuit 515 may communicate data through a second communication channel at operation 1303.

According to various embodiments of the disclosure, the electronic device 510 may receive power reception mode switching data from the external electronic device 520 through the first or second communication channel at operation 1301 or 1303.

According to various embodiments of the disclosure, the second processor 513 may perform authentication on the external electronic device 520 based on the data for verifying whether the external electronic device 520 is a genuine product, the data being included in the power reception mode switching data. The second processor 513 may determine whether to perform power reception mode switching based on the authentication result on the external electronic device 520. By way of example, when the external electronic device 520 passes the authentication, the second processor 513 may control the wireless power reception circuit 511 to perform power reception mode switching from the first power reception mode to the second power reception mode. By way of another example, when the external electronic device 520 fails the authentication, the second processor 513 may control the wireless power reception circuit 511 to remain in the first power reception mode.

According to various embodiments of the disclosure, the wireless power transmission circuit 525 and the wireless power reception circuit 511 may detect a detach of the electronic device 510 and the external electronic device 520 from each other at operation 1305.

According to various embodiments of the disclosure, the detach of the electronic device 510 and the external electronic device 520 from each other may mean that the electronic device 510 and the external electronic device 520 have become too far apart from each other to perform wireless power transfer.

According to various embodiments of the disclosure, the detach of the electronic device 510 and the external electronic device 520 from each other may cause a phase transition to the ping detection phase for detecting proximity between the external electronic device 520 and the electronic device 510.

According to various embodiments of the disclosure, the wireless power transmission circuit 525 and the wireless power reception circuit 511 may detect the detach of the electronic device 510 and the external electronic device 520 from each other by ascertaining that predetermined data (e.g., CEP) are not received through the first communication channel over a predetermined time period during a charging session.

According to various embodiments of the disclosure, the wireless power transmission circuit 525 may transmit a ping signal upon detection of the detach of the electronic device 510 and the external electronic device 520 from each other. The external electronic device 520 may perform phase transition to the ping detection phase for detecting proximity between the external electronic device 520 and the electronic device 510 that transmits a ping signal to detect the proximity of the electronic device 510.

According to various embodiments of the disclosure, the first processor 523 may control the first wireless communication circuit 521 to release the second communication channel at operation 1307 upon detection of the power transfer phase transition.

In the embodiment of FIG. 12, the second processor 513 may control the second wireless communication circuit 515 to release the second communication channel upon detection of the power transfer phase transition. However, it may also be possible for the first processor 523 to control the first wireless communication circuit 521 to release the second communication channel as shown in FIG. 13.

According to various embodiments of the disclosure, the first processor 523 may control the first wireless communication circuit 521 to release the second communication channel upon detection of the transition from the power transfer phase to the ping detection phase.

According to various embodiments of the disclosure, the first wireless communication circuit 521 and the second wireless communication circuit 515 may release the second communication channel at operation 1309.

Through the above-described operation, it is possible to protect against occurrence of a cross-connection in a situation where the distance between the electronic device 510 and the external electronic device 520 becomes too far to perform wireless power transfer and the external electronic device 520 is transferring power wirelessly to another electronic device (e.g., second electronic device 403).

Figure 14:
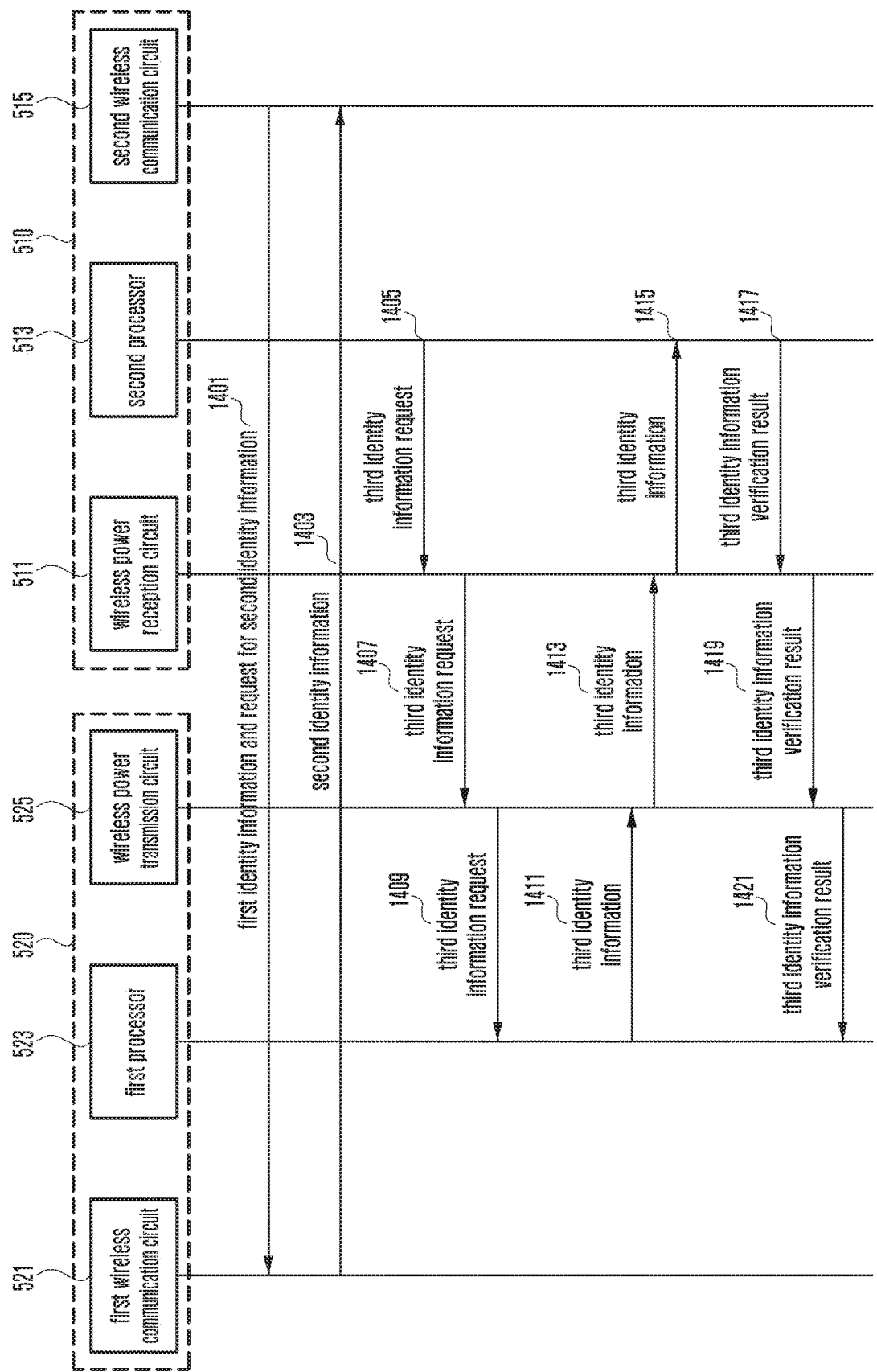
FIG. 14 is a signal flow diagram illustrating a procedure for an electronic device to establish a first communication channel according to various embodiments of the disclosure.

FIG. 14 is a signal flow diagram illustrating a procedure for an electronic device to establish a first communication channel according to various embodiments of the disclosure.

In the embodiments of FIGS. 4A to 4C and FIGS. 5 to 13, the electronic device (e.g., first electronic device 401) receives the first and second identity information through the first communication channel. In the embodiment of FIG. 14, the electronic device (e.g., first electronic device 401) receives the first identity information through the second communication channel and determines whether to establish the first communication channel.

According to various embodiments of the disclosure, the second wireless communication circuit 515 may transmit a signal including first identity information and a request for second identity information to the first wireless communication circuit 521 through the second communication channel at operation 1401.

According to various embodiments of the disclosure, the first wireless communication circuit 521 may transmit the second identity information to the second wireless communication circuit 515 through the second communication channel at operation 1403.

According to various embodiments of the disclosure, the second processor 513 may control the wireless power reception circuit 511 to transmit a signal requesting third identity information through the first communication channel at operation 1405.

According to various embodiments of the disclosure, the wireless power reception circuit 511 may transmit the signal requesting the third identity information to the wireless power transmission circuit 525 through the first communication channel at operation 1407.

According to various embodiments of the disclosure, the wireless power transmission circuit 525 may deliver the signal requesting the third identity information to the first processor 523 at operation 1409, and the first processor 523, at operation 1411, may control the wireless power transmission circuit 525 to transmit the third identity information to the electronic device 510.

According to various embodiments of the disclosure, the wireless power transmission circuit 525 may transmit the third identity information to the wireless power reception circuit 511 through the first communication channel at operation 1413.

According to various embodiments of the disclosure, the wireless power reception circuit 511 may deliver the third identity information to the second processor 513 at operation 1415.

According to various embodiments of the disclosure, the second processor 513 may determine whether the third identity information is transmitted by the external electronic device 520 that has transmitted the second identity information. The second processor 513 may compare the second identity information received through the first communication channel with the third identity information received through the second communication channel. The second processor 513 may determine whether the second identity information and the third identity information match. When the second identity information and the third identity information match, the second processor 513 may verify that the third identity information is received from the external electronic device 520.

According to various embodiments of the disclosure, when it is verified that the third identity information is received from the external device 520, the second processor 513 may maintain the first and second communication channels. The second processor 513 may control the wireless power reception circuit 511 to continue receiving power wirelessly from the external electronic device 520. When it is verified that the third identity information is received from the external device 520, the second processor 513 may transmit a signal indicating that the second identity information and the third identity information match (e.g., id_correct packet) to the external electronic device 520 through the second communication channel.

According to various embodiments of the disclosure, when the second identity information and the third identity information are different from each other, the second processor 513 may determine that the third identity information is received from an external electronic device (e.g., second power transmission device 404) other than the external electronic device 520. In the case where the second identity information and the third identity information are different from each other, a cross-connection may occur.

According to various embodiments of the disclosure, when it is determined that the second identity information is received from an external electronic device (e.g., second power transmission device 404) other than the external electronic device 520, the second processor 513 may stop wireless power charging.

According to various embodiments of the disclosure, the second identity information and the third identity information may be transmitted in the form of anonymous data packets. The anonymous data packet may be implemented in the form of a random number generated in various schemes. For example, the anonymous data packet may be implemented as one-time data (instant or disposable data) generated using a one-time random number. The first processor 523 may generate the anonymous data packet corresponding to the second identity information and transmit the anonymous data packet corresponding to the second identity information to the electronic device 510 through the second communication channel. The first processor 523 may generate the anonymous data packet corresponding to the third identity information and transmit the anonymous data packet corresponding to the third identity information to the electronic device 510 through the first communication channel.

According to various embodiments of the disclosure, the second processor 513 may compare the anonymous data packet corresponding to the second identity information that is received through the first communication channel and the anonymous data packet corresponding to the third identity information that is received through the second communication channel. When the anonymous data packets are generated with the same random number, the second processor 513 may determine that the same external electronic device is connected through both the first and second communication channels.

According to various embodiments of the disclosure, the second processor 513 may control, at operation 1417, the wireless power reception circuit 511 to transmit the third identity information verification result to the external electronic device 520. The wireless power reception circuit 511 may transmit the third identity information verification result to the wireless power transmission circuit 525 through the first communication channel, at operation 1419. The wireless power transmission circuit 525 may deliver the third identity information verification result to the first processor 523 at operation 1421.

Although it is depicted that the operations of operations 1417, 1419, and 1421 are performed through the first communication channel in the drawing, operations 1417, 1419, and 1421 may be performed through the second communication channel instead of the first communication channel.

According to various embodiments of the disclosure, the electronic device 510 and the external electronic device 520 may each perform the third identity information verification and, in this case, the operations of operations 1417, 1419, and 1421 for transmitting the verification result from the electronic device 510 to the external electronic device 520 may be omitted.

According to various embodiments of the disclosure, an electronic device may include a wireless power reception circuit, a wireless communication circuit, and a processor, which may be configured to control to receive first identity information through a first in-band communication channel connected to a first external wireless power transmission circuit outside the electronic device using the wireless power reception circuit, establish a first out-of-band communication channel with a first external wireless communication circuit corresponding to the first wireless power transmission circuit outside the electronic device based on the first identity information using the wireless communication circuit while the first in-band communication channel is established between the wireless power reception circuit and the first external wireless power transmission circuit, receive second identity information through a second in-band communication channel connected to a second external wireless power transmission circuit outside the electronic device using the wireless power reception circuit while the first out-of-band communication channel is established between the wireless communication circuit and the first external wireless communication circuit, disconnect, when the first out-of-band communication channel is established while the second in-band communication channel is established between the wireless power reception circuit and the second external power transmission circuit, the first out-of-band communication channel, and establish a second out-of-band communication channel with a second external wireless communication circuit corresponding to the second external wireless power transmission circuit outside the electronic device automatically based on the second identity information using the wireless communication circuit.

According to various embodiments of the disclosure, the processor of the electronic device may be configured to control to identify that the first external wireless power transmission circuit and the second external wireless power transmission circuit belong to a same charging device based on at least part of the first identity information and the second identity information.

According to various embodiments of the disclosure, the processor of the electronic device may be configured to control to compare the second identity information with the first identity information and establish the second out-of-band communication channel based on at least part of determination that the second identity information is not identical to the first identity information.

According to various embodiments of the disclosure, the processor of the electronic device may be configured to control to receive third identity information from the first external wireless communication circuit through the first out-of-band communication channel before the second out-of-band communication channel is established, compare the third identity information with the second identity information, and establish the second out-of-band communication channel based on at least part of a determination that the third identity information is not identical to the second identity information.

According to various embodiments of the disclosure, the processor of the electronic device may be configured to control to receive fourth identity information from the second external wireless communication circuit after the second out-of-band communication channel is established.

According to various embodiments of the disclosure, the processor of the electronic device may be configured to control to determine whether the first external wireless communication circuit and the second external wireless communication circuit belong to the same charging device based on at least part of the third identity information and fourth identity information received from the first external wireless communication circuit through the first out-of-band communication channel.

According to various embodiments of the disclosure, the processor of the electronic device may be configured to control to maintain the first out-of-band communication channel based on at least part of a determination that the second identity information is identical to the first identity information.

According to various embodiments of the disclosure, the processor of the electronic device may be configured to control to detect a change of reception status of power being transmitted by the first external wireless power transmission circuit and release the first out-of-band communication channel upon detection of the change of power reception status.

According to various embodiments of the disclosure, an electronic device may include a wireless power reception circuit, a wireless communication circuit, and a processor that may be configured to receive a signal for establishing a first out-of-band communication channel with a first external wireless communication circuit corresponding to a first wireless power transmission circuit using the wireless communication circuit through the first in-band communication channel connected to the first wireless power transmission circuit outside the electronic device, transmit first identity information corresponding to the wireless power reception circuit to the first wireless power transmission circuit through the first in-band communication channel, receive second identity information corresponding to the first wireless power transmission circuit from the first wireless power transmission circuit through the first in-band communication channel, and establish the first-out-of-band communication channel based on the second identity information.

According to various embodiments of the disclosure, the processor of the electronic device may be configured to control to encrypt the first identity information as part of an operation of transmitting the first identity information through the first in-band communication channel.

According to various embodiments of the disclosure, the processor of the electronic device may be configured to control to receive power reception mode switching data from a first external wireless power transmission circuit through the first in-band communication channel, authenticate a charging device including the first external wireless power transmission circuit using the received data, and switch a power reception mode of the wireless power reception circuit based on an authentication result on the charging device.

According to various embodiments of the disclosure, the processor of the electronic device may be configured to control to receive power reception mode switching data from a charging device including an external wireless power transmission circuit through the first out-of-band communication channel, perform authentication on the charging device using the received data, and switch a power reception mode of the wireless power reception circuit based on an authentication result on the charging device.

According to various embodiments of the disclosure, the processor of the electronic device may be configured to control to detect change of a power reception mode associated with power being received from a charging device including an external wireless power transmission circuit via the wireless power reception circuit and release the first out-of-band communication channel using the wireless communication circuit upon detection of the change of the power reception status.

According to various embodiments of the disclosure, the processor of the electronic device may be configured to control to receive encrypted second identity information.

According to various embodiments of the disclosure, an electronic device may include a battery, a wireless power reception circuit, a wireless communication circuit, and a processor that is configured to control to charge the battery with first power being received wirelessly from an external electronic device using the wireless power reception circuit, transmit first anonymous data through a first communication channel connected to the external electronic device using the wireless power reception circuit, receive second anonymous data through the first communication channel connected to the external electronic device using the wireless power reception circuit, and receive, when the second anonymous data is predesignated identity information, second power wirelessly from the external electronic device to charge the battery using the wireless power reception circuit.

According to various embodiments of the disclosure, the processor of the electronic device may be configured to control to determine whether the external electronic device supports decryption of the first anonymous data or encryption of the second anonymous data, and charge the battery without establishing the second communication channel based on a determination that the external electronic device is not able to support decryption of the first anonymous data or encryption of the second anonymous data.

According to various embodiments of the disclosure, the processor of the electronic device may be configured to control to determine whether the external electronic device supports decryption of the first anonymous data or encryption of the second anonymous data and continue charging the battery with the first power or stop charging the battery based on a determination that the external electronic device is not able to support decryption of the first anonymous data or encryption of the second anonymous data.

According to various embodiments of the disclosure, an electronic device may include a battery, a wireless power reception circuit, a wireless communication circuit, and a processor that is configured to control to charge the battery with power wirelessly received from a first external wireless power transmission circuit outside the electronic device using the wireless power reception circuit, receive first identity information through a first in-band communication channel connected to the first external wireless power transmission circuit using the wireless power reception circuit, establish a first out-of-band communication channel with a first external communication circuit corresponding to the first external wireless power transmission circuit outside the electronic device based on the first identity information using the wireless communication circuit while the first in-band communication channel is established between the wireless power reception circuit and the first external wireless power transmission circuit, receive second identity information through the second in-band communication channel connected to a second external wireless power transmission circuit outside the electronic device using the wireless power reception circuit while the first out-of-band communication channel is established between the wireless communication circuit and the first external wireless communication circuit, determine whether the second identity information is received from a charging device including the first external wireless power transmission circuit, and release the first out-of-band communication channel based on a determination that the second identity information is not received from the charging device.

According to various embodiments of the disclosure, an electronic device may include a wireless power reception circuit, a wireless communication circuit, and a processor that is configured to control to transmit first anonymous data through an in-band communication channel connected to a first external wireless power transmission circuit outside the electronic device using the wireless power reception circuit, receive second anonymous data through the in-band communication channel connected to the first external wireless power transmission circuit using the wireless power reception circuit, and establish an out-of-band communication channel using the wireless communication circuit based on comparison result between the first and second anonymous data.

According to various embodiments of the disclosure, the processor of the electronic device may be configured to control to encrypt to first anonymous data as part of transmitting the first anonymous data through the first in-band communication channel.

According to various embodiments of the disclosure, the processor of the electronic device may be configured to control to determine whether a charging device including the first external wireless power transmission circuit supports decryption of the first anonymous data or encryption of the second anonymous data and skip establishing the out-of-band communication channel based on determination that the charging device is not able to support decryption of the first anonymous data or encryption of the second anonymous data.

According to various embodiments of the disclosure, the electronic device further includes a battery, and the processor of the electronic device may be configured to control to skip establishing the out-of-band communication channel based on determination that the charging device is not able to support encryption, communicate non-anonymized data through the in-band communication channel, and charge the battery using the power reception circuit.

According to various embodiments of the disclosure, an electronic device may include a wireless power reception circuit, a wireless communication circuit, and a processor that is configured to control to transmit first anonymous data through an in-band communication channel connected to a first external wireless power transmission circuit outside the electronic device using the wireless power reception circuit, receive second anonymous data through an out-of-band communication channel of the electronic device using the wireless communication circuit, and manage the in-band communication channel or the out-of-band communication channel based on the first anonymous data or the second anonymous data.

According to various embodiments of the disclosure, the processor of the electronic device may be configured to control to ascertain a first random number included in the first anonymous data, ascertain a second random number included in the second anonymous data, and manage at least one of the in-band communication channel and the out-of-band communication channel based on a determination on whether the first and second random numbers are identical to each other.

Figure 15:
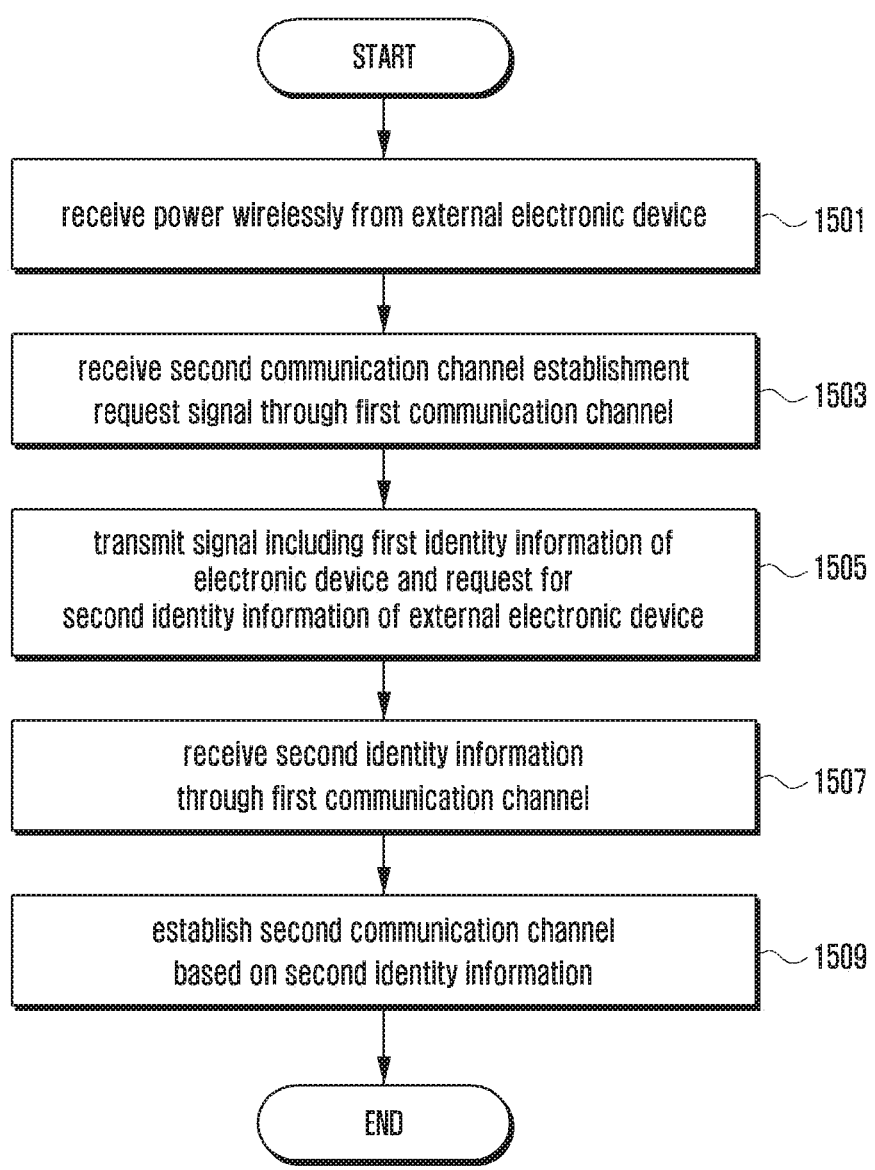
FIG. 15 is a flowchart illustrating an operation method of an electronic device according to various embodiments of the disclosure.

FIG. 15 is a flowchart illustrating an operation method of an electronic device according to various embodiments of the disclosure.

In the embodiment of FIG. 15, the electronic device (e.g., first electronic device 401 and electronic device 510) may receive power wirelessly from an external electronic device (e.g. external electronic device 520) at operation 1501.

According to various embodiments of the disclosure, the electronic device 510 may communicate data with the external electronic device 520 through a first communication channel established using part of a frequency band in use for wireless power transfer.

According to various embodiments of the disclosure, the electronic device 510 may receive a second communication channel activation request signal through the first communication channel at operation 1503.

According to various embodiments of the disclosure, the second communication channel activation request signal may include data for use in establishing a second communication channel. The data used in establishing the second communication channel may include address data of the external electronic device 520 for the second communication channel and information on the second communication channel. The data included in the second communication channel activation request signal may be encrypted using various methods (e.g., anonymous packet).

According to various embodiments of the disclosure, the electronic device 510 may transmit a signal including identity information of the electronic device 510, i.e., first identity information, and a request for identity information of the external electronic device 520, i.e., second identity information, to the second external electronic device 520 through the first communication channel at operation 1505.

According to various embodiments of the disclosure, the first identity information may include the identity information of the first electronic device 401 that is transmitted through the first communication channel 441. The second identity information may include the identity information of the first power transmission device 402 that is transmitted through the first communication channel 441. The first identity information and the second identity information may include an ID of the device (e.g., model name and identity information of the electronic device), operation mode information, IMEI, communication circuit identity information (e.g., identity information for establishing the second communication channel and MAC address), and a public key for encryption. The first and second identity information may be encrypted in the form of anonymized data to be transmitted/received.

According to various embodiments of the disclosure, the electronic device 510 may transmit a signal requesting the second identity information along with the first identity information. According to an embodiment, the electronic device 510 may encrypt the first identity information using various methods and transmit the encrypted identity information to the external electronic device. By encrypting the identity information, it is possible to prevent another electronic device (e.g., second electronic device 403) connected to the external electronic device 520 from ascertaining the identity information of the electronic device 510, thereby strengthening security.

According to various embodiments of the disclosure, the electronic device 510 may receive the second identity information through the first communication channel at operation 1507.

According to various embodiments of the disclosure, the electronic device 510 may activate the second communication channel at operation 1509 based on the second identity information.

According to various embodiments of the disclosure, the electronic device 510 may activate the second communication channel with the second identity information. The electronic device 510 may be controlled to establish the second communication channel with the external electronic device 520 identified by the second identity information and avoid establishing the second communication channel with other external electronic devices (e.g., second power transmission device 404). The external electronic device 520 may also be controlled to establish the second communication channel with the electronic device 510 identified by the first identity information. For example, the external electronic device 520 may be controlled to establish the second communication channel with the electronic device 510 identified by the first identity information and avoid establishing the second communication channel with another electronic device (e.g., second electronic device 403). Through the above operation, it is possible to avoid occurrence of a cross-connection.

Figure 16:
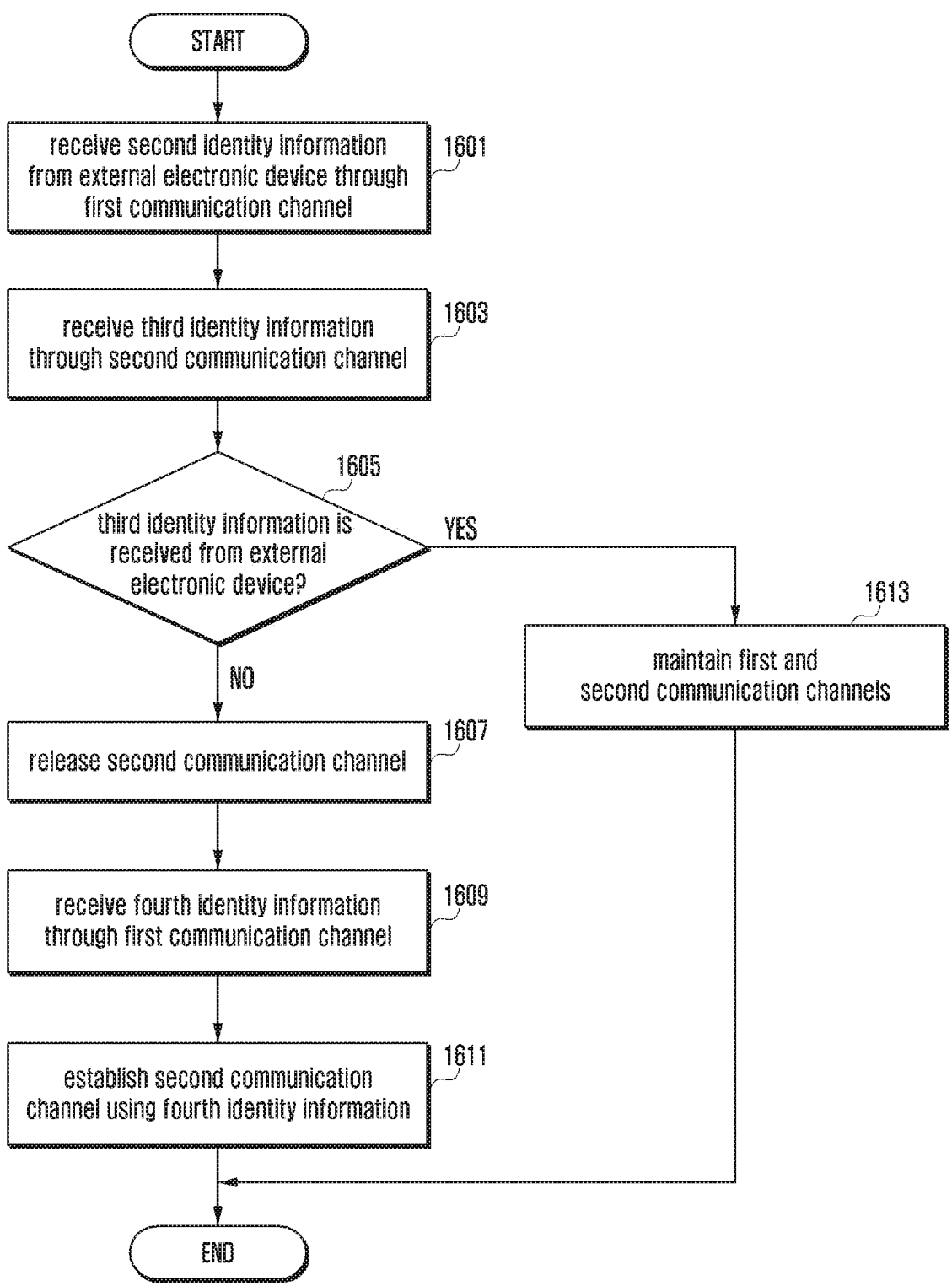
FIG. 16 is a flowchart illustrating an operation method of an electronic device according to various embodiments of the disclosure.

FIG. 16 is a flowchart illustrating an operation method of an electronic device according to various embodiments of the disclosure.

Referring to FIG. 16, the electronic device (e.g., first electronic device 401 and electronic device 510) may receive second identity information from an external electronic device (e.g., external electronic device 520) through a first communication channel at operation 1601.

According to various embodiments of the disclosure, the electronic device 510 may receive third identity information through a second communication channel at operation 1603. The third identity information may be the identity information of the external electronic device 520 that is received through the second communication channel.

According to various embodiments of the disclosure, the electronic device 510 may determine at operation 1605 whether the third identity information is received from the external electronic device 520. It may be possible to compare the second identity information with the third identity information to verify that the second and third identity information are received from the same external electronic device.

According to various embodiments of the disclosure, the electronic device 510 may determine whether the third identity information is received from the external electronic device 520 based on at least the second identity information. The electronic device 510 may compare the second identity information and the third identity information to determine whether the second identity information and the third identity information are identical to each other. When the second identity information and the third identity information are identical to each other, the electronic device 510 may verify that the third identity information is received from the external electronic device 520.

According to various embodiments of the disclosure, the electronic device 510 may determine whether to release the second communication channel based on the third identity information verification result and control the first wireless communication circuit 521 based on the determination result. When it is determined that the third identity information is transmitted by the external electronic device that has transmitted the second identity information, the electronic device 510 may maintain the first and second communication channels.

According to various embodiments of the disclosure, when it is determined that the third identity information is received from an external electronic device other than the external electronic device 520, the electronic device 510 may release the second communication channel at operation 1607.

According to various embodiments of the disclosure, the electronic device 510 may receive fourth identity information through the first communication channel at operation 1609.

According to various embodiments of the disclosure, the electronic device 510 may reestablish the second communication channel, at operation 1611, using the fourth identity information received through the first communication channel.

According to various embodiments of the disclosure, when it is determined that the third identity information is received from the external electronic device 520, the electronic device 510 may maintain the first and second communication channels at operation 1613.

Figure 17:
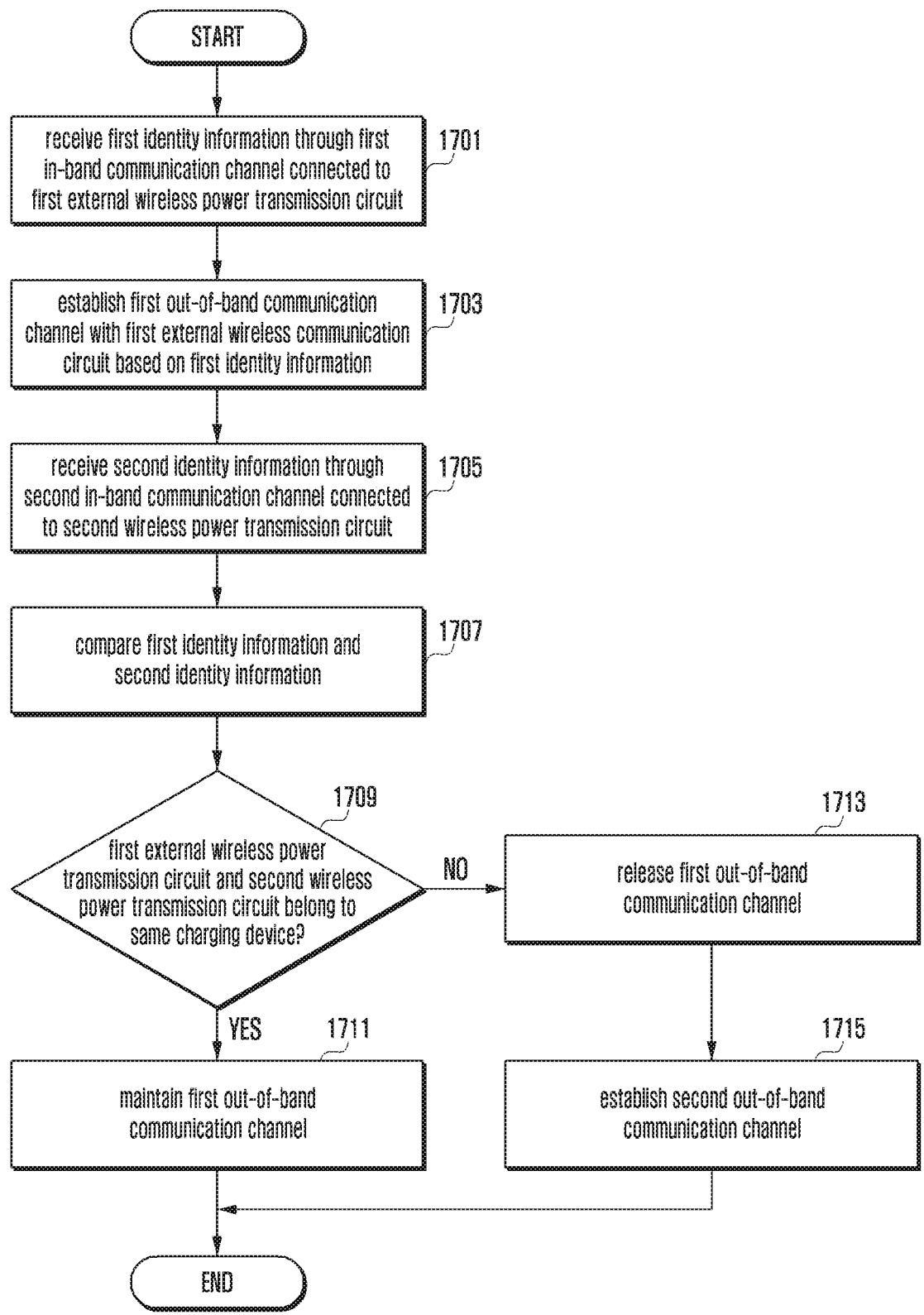
FIG. 17 is a flowchart illustrating an operation method of an electronic device according to various embodiments of the disclosure.

FIG. 17 is a flowchart illustrating an operation method of an electronic device according to various embodiments of the disclosure.

Referring to FIG. 17, the electronic device (e.g., first electronic device 401) may receive first identity information at operation 1701 through a first in-band communication channel (e.g., first communication channel 441) established with a first external wireless power transmission circuit (e.g., wireless power transmission circuit 450).

According to various embodiments of the disclosure, the first identity information may be an identifier of the first wireless power transmission circuit.

According to various embodiments of the disclosure, the first electronic device 401 may establish a first out-of-band communication channel (e.g., second communication channel 451) with a first external wireless communication circuit at operation 1703 based on the first identity information.

The first out-of-band communication channel may mean a communication channel established between the first electronic device 401 and the first wireless communication circuit corresponding to the first external wireless power transmission circuit. The first electronic device 401 may establish a first out-of-band communication channel based on the data for connection of the first out-of-band communication channel that is included in the data related to the first identity information.

According to various embodiments of the disclosure, the first electronic device 401 may receive second identity information at operation 1705 through the second in-band communication channel (e.g., first communication channel 441) connected to the second wireless power transmission circuit (e.g., wireless power transmission circuit 450).

According to various embodiments of the disclosure, the second identity information may mean an identifier of the second wireless power transmission circuit.

According to various embodiments of the disclosure, the electronic device may compare the first identity information and the second identity information at operation 1707.

According to various embodiments of the disclosure, the electronic device may determine at operation 1709 whether the first external wireless power transmission circuit and the second wireless power transmission circuit belong to the same charging device (e.g., first power transmission device 402). The first electronic device 401 may determine whether the first external wireless power circuit and the second external wireless power circuit belong to the same charging device based on the result of the comparison between the first identity information and the second identity information.

According to various embodiments of the disclosure, when it is determined that the first external wireless power transmission circuit and the second wireless power transmission circuit belong to the same charging device, the electronic device may maintain the connection of first out-of-band communication channel at operation 1711.

According to various embodiments of the disclosure, when it is determined that the first external wireless power transmission circuit and the second wireless power transmission circuit belong to different charging devices, the first electronic device 401 may release the first out-of-band communication channel at operation 1713.

According to various embodiments of the disclosure, the first electronic device 401 may establish a second out-of-band communication channel at operation 1715. The second out-of-band communication channel may mean a communication channel established between the first electronic device 401 and a second external wireless communication circuit corresponding to a second external wireless power transmission circuit. The first electronic device 401 may establish the second out-of-band communication channel based on the data for establishing the second out-of-band communication channel that is included in the data related to the second identity information.

According to various embodiments of the disclosure, an operation method of an electronic device may include receiving first identity information through a first in-band communication channel connected to a first external wireless power transmission circuit outside the electronic device using the wireless power reception circuit, establishing a first out-of-band communication channel with a first external wireless communication circuit corresponding to the first wireless power transmission circuit outside the electronic device based on the first identity information using the wireless communication circuit while the first in-band communication channel is established between the wireless power reception circuit and the first external wireless power transmission circuit, receiving second identity information through a second in-band communication channel connected to a second external wireless power transmission circuit outside the electronic device using the wireless power reception circuit while the first out-of-band communication channel is established between the wireless communication circuit and the first external wireless communication circuit, disconnecting, when the first out-of-band communication channel is established while the second in-band communication channel is established between the wireless power reception circuit and the second external power transmission circuit, the first out-of-band communication channel, and establishing a second out-of-band communication channel with a second external wireless communication circuit corresponding to the second external wireless power transmission circuit outside the electronic device automatically based on the second identity information using the wireless communication circuit.

According to various embodiments of the disclosure, the operation method of the electronic device may further include identifying that the first external wireless power transmission circuit and the second external wireless power transmission circuit belong to a same charging device based on at least part of the first identity information and the second identity information.

According to various embodiments of the disclosure, establishing the second out-of-band communication channel automatically in the operation method of the electronic device may include comparing the second identity information with the first identity information and establishing the second out-of-band communication channel based on at least part of a determination that the second identity information is not identical to the first identity information.

According to various embodiments of the disclosure, establishing the second out-of-band communication channel automatically in the operation method of the electronic device may include receiving third identity information from the first external wireless communication circuit through the first out-of-band communication channel before the second out-of-band communication channel is established, comparing the third identity information with the second identity information, and establishing the second out-of-band communication channel based on at least part of a determination that the third identity information is not identical to the second identity information.

According to various embodiments of the disclosure, the operation method of the electronic device may further include receiving fourth identity information from the second external wireless communication circuit after the second out-of-band communication channel is established.

According to various embodiments of the disclosure, the operation method of the electronic device may further include determining whether the first external wireless communication circuit and the second external wireless communication circuit belong to the same charging device based on at least part of the third identity information and fourth identity information received from the first external wireless communication circuit through the first out-of-band communication channel.

As described above, the electronic device and its operation method for controlling a wireless charging-related communication channel according to various embodiments of the disclosure is advantageous in terms of improving a data transmission or reception speed using a wireless communication scheme supporting a data rate higher than that of the in-band communication scheme.

The electronic device and its operation method for controlling a wireless charging-related communication channel according to various embodiments of the disclosure is advantageous in terms of avoiding a cross-connection by protecting against inadvertent connection to an unintended power transmission device in such a way of establishing an OOB communication path with a proper power transmission device using identity information of the power transmission device.

The electronic device and its operation method for controlling a wireless charging-related communication channel according to various embodiments of the disclosure is advantageous in terms of avoiding a cross-connection by verifying the connection to a proper power transmission device via a comparison between identity information received in a DMS OBB communication scheme and identity information received in an in-band communication scheme.

The electronic device and its operation method for controlling a wireless charging-related communication channel according to various embodiments of the disclosure is advantageous in terms of avoiding a potential cross-connection with a nearby electronic device communicating in in-band communication scheme by releasing the OBB communication link when the state of the electronic device is changed.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that when an element (e.g., a first element) is referred to, with or without the term "operatively" or "communicatively", as "coupled with," "coupled to," "connected with," or "connected to" another element (e.g., a second element), it means that the element may be coupled with the other element directly (e.g., via a wired connection), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., program 140) including one or more instructions that are stored in a storage medium (e.g., internal memory 136 or external memory 138) that is readable by a machine (e.g., electronic device 101). For example, a processor (e.g., processor 120) of the machine (e.g., electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A portable communication device comprising:
    a wireless power reception circuit;
    a wireless communication circuit; and
    a processor configured to control to:
        receive first identity information through a first in-band communication channel connected to a first external wireless power transmission circuit outside the portable communication device using the wireless power reception circuit,
        establish a first out-of-band communication channel with a first external wireless communication circuit corresponding to a first wireless power transmission circuit outside the portable communication device based on the first identity information using the wireless communication circuit while the first in-band communication channel is established between the wireless power reception circuit and the first external wireless power transmission circuit,
        receive second identity information through a second in-band communication channel connected to a second external wireless power transmission circuit outside the portable communication device using the wireless power reception circuit while the first out-of-band communication channel is established between the wireless communication circuit and the first external wireless communication circuit,
        disconnect, when the first out-of-band communication channel is established while the second in-band communication channel is established between the wireless power reception circuit and the second external power transmission circuit, the first out-of-band communication channel, and
        establish a second out-of-band communication channel with a second external wireless communication circuit corresponding to the second external wireless power transmission circuit outside the portable communication device automatically based on the second identity information using the wireless communication circuit.

2. The portable communication device of claim 1, wherein the processor is further configured to control to identify that the first external wireless power transmission circuit and the second external wireless power transmission circuit belong to the same charging device based on at least part of the first identity information and the second identity information.

3. The portable communication device of claim 1, wherein the processor is further configured to control to:
    compare the second identity information with the first identity information, and establish the second out-of-band communication channel based on at least part of a determination that the second identity information is not identical to the first identity information.

4. The portable communication device of claim 1, wherein the processor is further configured to control to:
receive third identity information from the first external wireless communication circuit through the first out-of-band communication channel before the second out-of-band communication channel is established,
compare the third identity information with the second identity information, and
establish the second out-of-band communication channel based on at least part of a determination that the third identity information is not identical to the second identity information.

5. The portable communication device of claim 4, wherein the processor is further configured to control to receive fourth identity information from the second external wireless communication circuit after the second out-of-band communication channel is established.

6. The portable communication device of claim 5, wherein the processor is further configured to control to determine whether the first external wireless communication circuit and the second external wireless communication circuit belong to the same charging device based on at least part of the third identity information and fourth identity information received from the first external wireless communication circuit through the first out-of-band communication channel.

7. The portable communication device of claim 1, wherein the processor is further configured to control to maintain the first out-of-band communication channel based on at least part of a determination that the second identity information is identical to the first identity information.

8. The portable communication device of claim 1, wherein the processor is further configured to control to:
detect a change of reception status of power being transmitted by the first external wireless power transmission circuit, and
release the first out-of-band communication channel upon detection of the change of power reception status.

9. A portable communication device comprising:
a wireless power reception circuit;
a wireless communication circuit; and
a processor configured to control to:
receive a signal for establishing a first out-of-band communication channel with a first external wireless communication circuit corresponding to a first wireless power transmission circuit using the wireless communication circuit through a first in-band communication channel connected to the first wireless power transmission circuit outside the portable communication device,
transmit first identity information corresponding to the wireless power reception circuit to the first wireless power transmission circuit through the first in-band communication channel,
receive second identity information corresponding to the first wireless power transmission circuit from the first wireless power transmission circuit through the first in-band communication channel, and
establish the first out-of-band communication channel based on the second identity information.

10. The portable communication device of claim 9, wherein the processor is further configured to control to encrypt the first identity information as part of an operation of transmitting the first identity information through the first in-band communication channel.

11. The portable communication device of claim 9, wherein the processor is further configured to control to:
receive power reception mode switching data from a first external wireless power transmission circuit through the first in-band communication channel,
authenticate a charging device including the first external wireless power transmission circuit using the received data, and
switch a power reception mode of the wireless power reception circuit based on an authentication result on the charging device.

12. The portable communication device of claim 9, wherein the processor is further configured to control to:
receive power reception mode switching data from a charging device including an external wireless power transmission circuit through the first out-of-band communication channel,
perform authentication on the charging device using the received data, and
switch a power reception mode of the wireless power reception circuit based on an authentication result on the charging device.

13. The portable communication device of claim 9, wherein the processor is further configured to control to:
detect change of a power reception mode associated with power being received from a charging device including an external wireless power transmission circuit via the wireless power reception circuit, and
release the first out-of-band communication channel using the wireless communication circuit upon detection of the change of a power reception status.

14. The portable communication device of claim 9, wherein the processor is further configured to control to receive encrypted second identity information.

15. An operation method of a portable communication device, the method comprising:
receiving first identity information through a first in-band communication channel connected to a first external wireless power transmission circuit outside the portable communication device using a wireless power reception circuit;
establishing a first out-of-band communication channel with a first external wireless communication circuit corresponding to a first wireless power transmission circuit outside the portable communication device based on the first identity information using a wireless communication circuit while the first in-band communication channel is established between the wireless power reception circuit and the first external wireless power transmission circuit;
receiving second identity information through a second in-band communication channel connected to a second external wireless power transmission circuit outside the portable communication device using the wireless power reception circuit while the first out-of-band communication channel is established between the wireless communication circuit and the first external wireless communication circuit;
disconnecting, when the first out-of-band communication channel is established while the second in-band communication channel is established between the wireless power reception circuit and the second external power transmission circuit, the first out-of-band communication channel; and establishing a second out-of-band communication channel with a second external wireless communication circuit corresponding to the second external wireless power transmission circuit outside the portable communication device automatically based on the second identity information using the wireless communication circuit.

16. The method of claim 15, further comprising identifying that the first external wireless power transmission circuit and the second external wireless power transmission circuit belong to the same charging device based on at least part of the first identity information and the second identity information.

17. The method of claim 15, wherein the establishing of the second out-of-band communication channel automatically comprises:
comparing the second identity information with the first identity information; and
establishing the second out-of-band communication channel based on at least part of a determination that the second identity information is not identical to the first identity information.

18. The method of claim 15, wherein the establishing of the second out-of-band communication channel automatically comprises:
receiving third identity information from the first external wireless communication circuit through the first out-of-band communication channel before the second out-of-band communication channel is established;
comparing the third identity information with the second identity information, and
establishing the second out-of-band communication channel based on at least part of a determination that the third identity information is not identical to the second identity information.

19. The method of claim 18, further comprising receiving fourth identity information from the second external wireless communication circuit after the second out-of-band communication channel is established.

20. The method of claim 19, further comprising determining whether the first external wireless communication circuit and the second external wireless communication circuit belong to the same charging device based on at least part of the third identity information and fourth identity information received from the first external wireless communication circuit through the first out-of-band communication channel.

21. A portable communication device comprising:
a battery;
a wireless power reception circuit;
a wireless communication circuit; and
a processor configured to control to:
charge the battery with first power being received wirelessly from an external electronic device using the wireless power reception circuit,
transmit first anonymous data through a first communication channel connected to the external electronic device using the wireless power reception circuit,
receive second anonymous data through the first communication channel connected to the external electronic device using the wireless power reception circuit, and
receive, when the second anonymous data is predesignated identity information, second power wirelessly from the external electronic device to charge the battery using the wireless power reception circuit.

22. The portable communication device of claim 21, wherein the processor is further configured to control to:
determine whether the external electronic device supports decryption of the first anonymous data or encryption of the second anonymous data, and
charge the battery without establishing a second communication channel based on a determination that the external electronic device is not able to support decryption of the first anonymous data or encryption of the second anonymous data.

23. The portable communication device of claim 21, wherein the processor is further configured to control to:
determine whether the external electronic device supports decryption of the first anonymous data or encryption of the second anonymous data, and
continue charging the battery with the first power or stop charging the battery based on a determination that the external electronic device is not able to support decryption of the first anonymous data or encryption of the second anonymous data.

24. A portable communication device comprising:
a battery;
a wireless power reception circuit;
a wireless communication circuit; and
a processor configured to control to:
charge the battery with power wirelessly received from a first external wireless power transmission circuit outside the portable communication device using the wireless power reception circuit,
receive first identity information through a first in-band communication channel connected to the first external wireless power transmission circuit using the wireless power reception circuit,
establish a first out-of-band communication channel with a first external communication circuit corresponding to the first external wireless power transmission circuit outside the portable communication device based on the first identity information using the wireless communication circuit while the first in-band communication channel is established between the wireless power reception circuit and the first external wireless power transmission circuit,
receive second identity information through a second in-band communication channel connected to a second external wireless power transmission circuit outside the portable communication device using the wireless power reception circuit while the first out-of-band communication channel is established between the wireless communication circuit and the first external wireless communication circuit,
determine whether the second identity information is received from a charging device including the first external wireless power transmission circuit, and
release the first out-of-band communication channel based on a determination that the second identity information is not received from the charging device.

25. A portable communication device comprising:
a wireless power reception circuit;
a wireless communication circuit; and
a processor configured to control to:
transmit first anonymous data through an in-band communication channel connected to a first external wireless power transmission circuit outside the portable communication device using the wireless power reception circuit,
receive second anonymous data through the in-band communication channel connected to the first external wireless power transmission circuit using the wireless power reception circuit, and
establish an out-of-band communication channel using the wireless communication circuit based on a comparison result between the first and second anonymous data.

26. The portable communication device of claim 25, wherein the processor is further configured to control to encrypt the first anonymous data as part of transmitting the first anonymous data through the first in-band communication channel.

27. The portable communication device of claim 25, wherein the processor is further configured to control to determine whether a charging device including the first external wireless power transmission circuit supports decryption of the first anonymous data or encryption of the second anonymous data and skip establishing the out-of-band communication channel based on a determination that the charging device is not able to support decryption of the first anonymous data or encryption of the second anonymous data.

28. The portable communication device of claim 27, further comprising:
a battery,
wherein the processor is further configured to:
control to skip establishing the out-of-band communication channel based on a determination that the charging device is not able to support encryption,
communicate non-anonymized data through the in-band communication channel, and
charge the battery using the power reception circuit.

29. A portable communication device comprising:
a wireless power reception circuit;
a wireless communication circuit; and
a processor configured to control to:
transmit first anonymous data through an in-band communication channel connected to a first external wireless power transmission circuit outside the portable communication device using the wireless power reception circuit,
receive second anonymous data through an out-of-band communication channel of the portable communication device using the wireless communication circuit, and
manage the in-band communication channel or the out-of-band communication channel based on the first anonymous data or the second anonymous data.

30. The portable communication device of claim 29, wherein the processor is further configured to control to:
ascertain a first random number included in the first anonymous data,
ascertain a second random number included in the second anonymous data, and
manage at least one of the in-band communication channel and the out-of-band communication channel based on a determination on whether the first and second random numbers are identical to each other.

31. A first electronic device comprising:
a wireless power communication interface;
a short-range communication interface; and
at least one processor configured to control to:
establish, via the wireless power communication interface, a first communication channel,
receive, via the wireless power communication interface, first identity information when the first communication channel is established,
establish, via the short-range communication interface, a second communication channel,
receive, via the short-range communication interface, second identity information when the second communication channel is established,
determine whether the first communication channel and the second communication channel are established with a single device based on the first identity information and the second identity information,
disconnect the second communication channel when the first communication channel is established in response to determining that the first communication channel and the second communication channel are established with different devices, and
establish, via the short-range communication interface, a third communication channel with a second electronic device based on the second identity information in response to determining that the first communication channel and the second communication channel are established with different devices.

32. The first electronic device of claim 31, wherein the at least one processor is further configured to control to:
maintain the first communication channel and the second communication channel in response to determining the first communication channel and the second communication channel are established with the single device.

33. The first electronic device of claim 31,
wherein the first identity information is received from the second electronic device, and
wherein the second identity information is received from a third electronic device different from the second electronic device.

34. The first electronic device of claim 31, wherein, to determine whether the first communication channel and the second communication channel are established with the single device, the at least one processor is further configured to control to:
compare the first identity information with the second identity information,
determine that the first communication channel and the second communication channel are established with the single device when the first identity information and the second identity information match, and
determining that the first communication channel and the second communication channel are established with different devices when the first identity information and the second identity information do not match.

35. The first electronic device of claim 31, wherein, to establish the second communication channel, the at least one processor is further configured to establish the second communication channel based on the first identity information.

36. The first electronic device of claim 31, wherein, to establish the first communication channel, the at least one processor is further configured to establish the first communication channel based on the second identity information.

37. The first electronic device of claim 31, further comprising:
a battery,
wherein the at least one processor is further configured to control to:
establish, via the wireless power communication interface, a power charging session to charge the battery.

38. The first electronic device of claim 37, wherein the at least one processor is further configured to control to:
detect an interruption to the power charging session,
determine whether a detach has occurred, and transmit, via the wireless power communication interface, an indication to disconnect the second communication channel in response to determining that the detach has occurred.

* * * * *